(12) United States Patent
Tani et al.

(10) Patent No.: US 6,574,177 B2
(45) Date of Patent: Jun. 3, 2003

(54) DATA READ METHOD FOR REMEDYING LOW-QUALITY READ DATA AND STORAGE APPARATUS EMPLOYING SUCH A DATA READ METHOD

(75) Inventors: Hiroshi Tani, Kawasaki (JP); Shigenori Yanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 104 days.

(21) Appl. No.: 09/794,560

(22) Filed: Feb. 27, 2001

(65) Prior Publication Data

US 2002/0034142 A1 Mar. 21, 2002

(30) Foreign Application Priority Data

Sep. 20, 2000 (JP) ........................................ 2000-285761

(51) Int. Cl.$^7$ .................................................. G11B 3/90
(52) U.S. Cl. ................. 369/53.35; 369/47.14; 369/47.18
(58) Field of Search ............................ 369/44.32, 47.14, 369/47.15, 47.18, 53.12, 53.15, 53.16, 53.17, 53.32, 53.35, 53.36

(56) References Cited

U.S. PATENT DOCUMENTS 5,461,517 A 10/1995 Suda et al.
5,517,477 A * 5/1996 Sako ........................ 369/44.32

FOREIGN PATENT DOCUMENTS

| GB | 2233811 | 1/1991 |
|----|---------|--------|
| JP | 3136152 | 6/1991 |
| JP | 6175934 | 6/1994 |

* cited by examiner

*Primary Examiner*—Paul W. Huber
(74) *Attorney, Agent, or Firm*—Greer, Burns & Crain, Ltd.

(57) ABSTRACT

A data read method includes a steps of reading identical data from one region on a recording medium a plurality of times, a step of comparing the data read the plurality of times in units of one or a plurality of bits to obtain comparison results, and generating read data made up of data values having a highest frequency for each unit based on the comparison results, and a step of carrying out an error detecting and correcting process with respect to the read data.

19 Claims, 25 Drawing Sheets

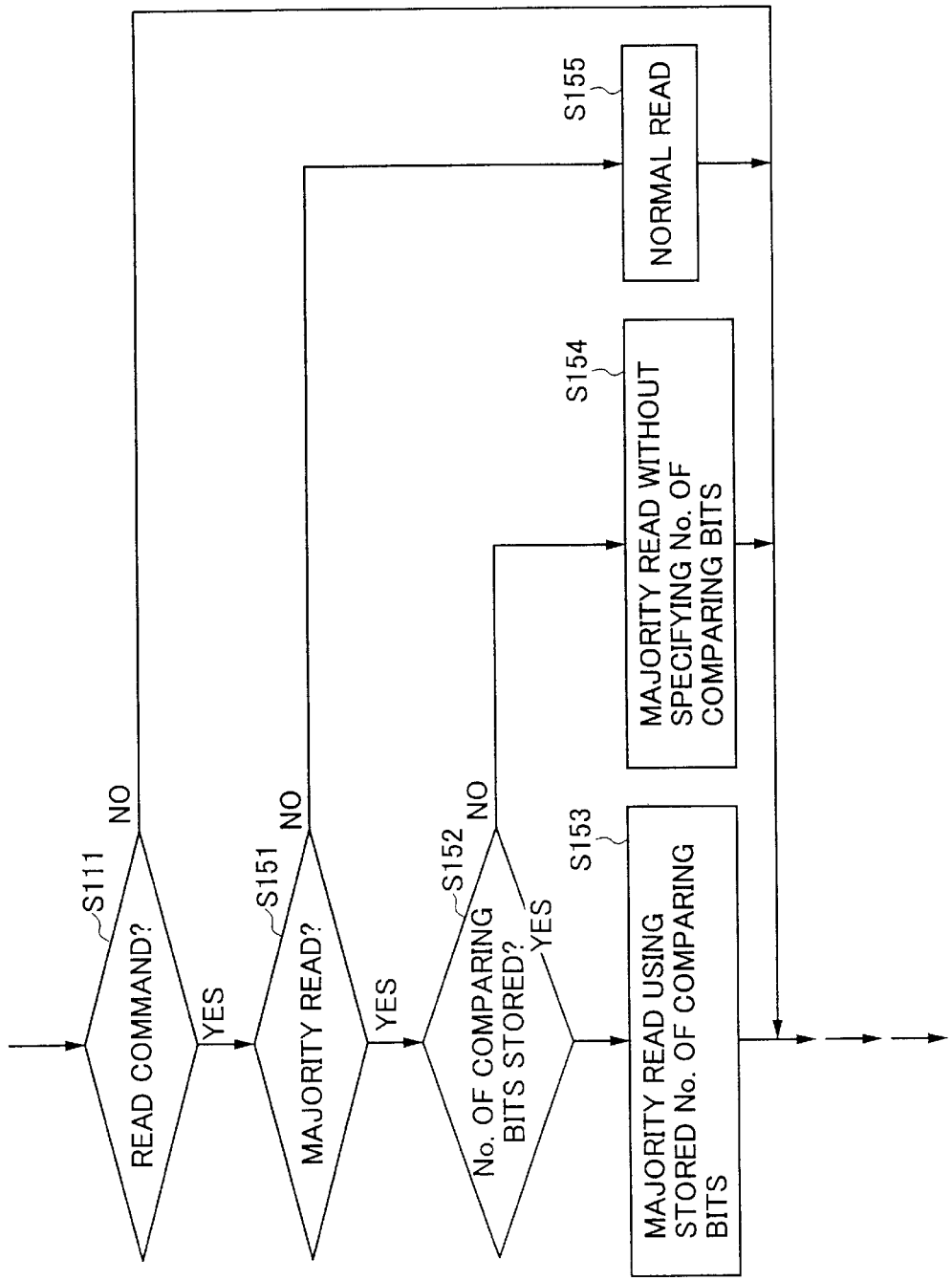

DATA READ METHOD FOR REMEDYING LOW-QUALITY READ DATA AND STORAGE APPARATUS EMPLOYING SUCH A DATA READ METHOD

BACKGROUND OF THE INVENTION

This application claims the benefit of a Japanese Patent Application No. 2000-285761 filed Sep. 20, 2000, in the Japanese Patent Office, the disclosure of which is hereby incorporated by reference.

1. Field of the Invention

The present invention generally relates to data read methods and storage apparatuses, and more particularly to a data read method which remedies low-quality read data and to a storage apparatus which employs such a data read method.

Recently, due to the increasing storage capacities of disks used in storage apparatuses such as magnetic disk units and optical disk units, there are demands to maintain high quality of read data read from the disk.

2. Description of the Related Art

Conventionally, the high quality of the read data is achieved by carrying out processes such as a retry process and an error detecting and correcting process. In the case of the optical disk unit, for example, the retry process improves the remedy efficiency of the read data by varying various retry parameters such as focus offset. In addition, the error detecting and correcting process improves the quality of the read data by using an error correction code (ECC). Accordingly, it is possible to improve the quality of the read data by carrying out the retry process and the error detecting and correcting process.

However, in the case of the optical disk, for example, a land recording system is employed to record data on lands which are separated by grooves. Recently, a so-called land-groove recording system has been proposed to record the data on both the land and the groove which are alternately provided in a radial direction of the optical disk. In the optical disk which employs this land-groove recording system, a distance between two adjacent tracks is extremely short, and a crosstalk is easily generated from the adjacent tracks to thereby deteriorate the quality of the read data.

Therefore, in an environment where the crosstalk is easily generated from the adjacent tracks of the recording medium due to the high data recording density on the recording medium such as the disk, the quality of the read data is poor, and there is a problem in that it is difficult to remedy the read data even when the conventional processes such as the retry process and the error detecting and correcting process are carried out.

The above described problem is not peculiar to the optical disk, and similar problems also occur in other recording media such as the magnetic disk due to the effects of the crosstalk caused by narrowing of the track pitch.

SUMMARY OF THE INVENTION

Accordingly, it is a general object of the present invention to provide a novel and useful data read method and storage apparatus, in which the problem described above is eliminated.

Another and more specific object of the present invention is to provide a data read method and a storage medium, which remedy read data, so that high-quality read data can be obtained even when the quality of the actual read data is poor.

Still another object of the present invention is to provide a data read method comprising the steps of (a) reading identical data from one region on a recording medium a plurality of times, (b) comparing the data read the plurality of times in units of one or a plurality of bits to obtain comparison results, and generating read data made up of data values having a highest frequency for each unit based on the comparison results, and (c) carrying out an error detecting and correcting process with respect to the read data. According to the data read method of the present invention, it is possible to remedy the read data, so that high-quality read data can be obtained even when the quality of the actual read data is poor.

A further object of the present invention is to provide a storage apparatus comprising reading means for reading identical data from one region on a recording medium a plurality of times, generating means for comparing the data read the plurality of times in units of one or a plurality of bits to obtain comparison results, and generating read data made up of data values having a highest frequency for each unit based on the comparison results, and correcting means for carrying out an error detecting and correcting process with respect to the read data. According to the storage apparatus of the present invention, it is possible to remedy the read data, so that high-quality read data can be obtained even when the quality of the actual read data is poor.

Another object of the present invention is to provide a storage apparatus comprising a reading section reading identical data from one region on a recording medium a plurality of times, a generating section comparing the data read the plurality of times in units of one or a plurality of bits to obtain comparison results, and generating read data made up of data values having a highest frequency for each unit based on the comparison results, and an error correcting section carrying out an error detecting and correcting process with respect to the read data. According to the storage apparatus of the present invention, it is possible to remedy the read data, so that high-quality read data can be obtained even when the quality of the actual read data is poor.

The present invention is particularly effective with respect to a state where a random error, that is, a carrier-to-noise ratio (CNR) is low, and a noise component relatively appears large.

In addition, it is possible to increase the possibility of hitting a correct data, by carrying out the read process a plurality of times and employing the value having the highest appearing frequency.

Furthermore, even in a state where the CNR deteriorates not only due to a crosstalk from an adjacent track on the recording medium but also due to dust particles or the like adhered on the surface of the recording medium, it is possible to improve the apparent CNR by carrying out the read process a plurality of times in case of a random error and employing the value having the highest appearing frequency.

Other objects and further features of the present invention will be apparent from the following detailed description when read in conjunction with the accompanying drawings.

BRIEF DESCRIPTION OF THE DRAWINGS

FIG. 25 is a flow chart for explaining a process of a sixteenth embodiment of the data read method according to the present invention.

DESCRIPTION OF THE PREFERRED EMBODIMENTS

Figure 1:
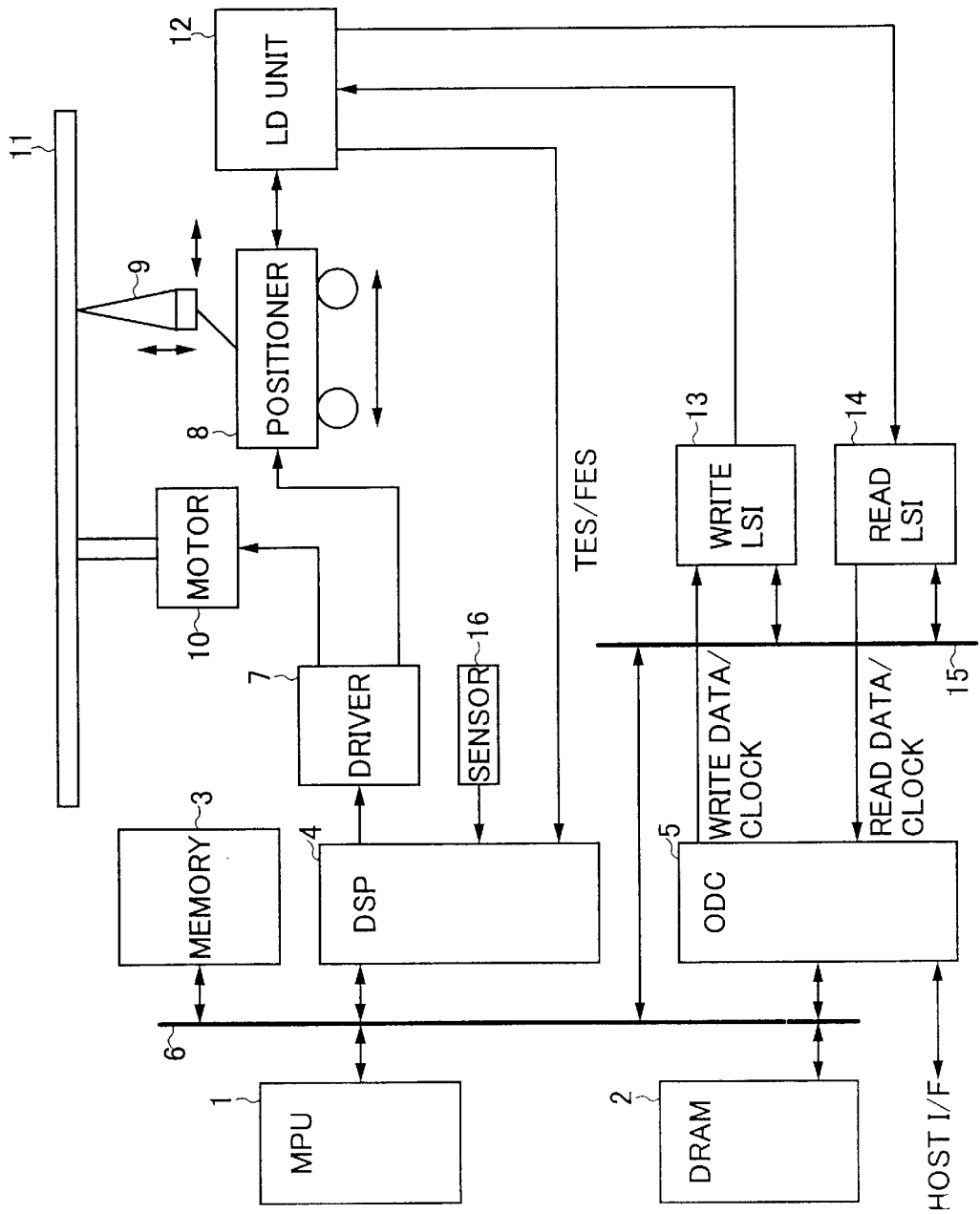
FIG. 1 is a diagram showing the basic structure of a first embodiment of a storage apparatus according to the present invention.

A description will be given of various embodiments of a data read method according to the present invention and a storage apparatus according to the present invention, by referring to the drawings.

FIG. 1 is a diagram showing the basic structure of a first embodiment of the storage apparatus according to the present invention. This first embodiment of the storage apparatus employs a first embodiment of the data read method according to the present invention. In this embodiment, the present invention is applied to an optical disk unit.

The optical disk unit shown in FIG. 1 generally includes a MPU 1, a DRAM 2, a nonvolatile memory 3, a digital signal processor (DSP) 4, an optical disk controller (ODC) 5, a bus 6, a driver 7, a positioner 8, a lens actuator 9, a spindle motor 10 for rotating an optical disk 11, a laser diode (LD) unit 12, a write LSI circuit 13, a read LSI circuit 14, a bus 15, and a temperature sensor 16. The MPU 1, the DRAM 2, the nonvolatile memory 3, the DSP 4 and the ODC 5 are connected via the bus 6. In addition, the ODC 5 is connected to a host interface (I/F, not shown) which exchanges commands and data with a host unit (not shown). On the other hand, the ODC 5, the bus 6, the write LSI circuit 13 and the read LSI circuit 14 are connected via the bus 15.

The MPU 1 controls the general operation of the optical disk unit. The DRAM 2 is shared by the MPU 1 and the ODC 5, and forms a buffer memory for providing a work area. The nonvolatile memory 3 is made of a ROM, for example, and stores programs to be executed by the MPU 1 and the like. The DSP 4 carries out various digital processes including an analog-to-digital conversion and a digital-to-analog conversion. The MPU 1 controls, via the DSP 4, the driver 7 which controls the spindle motor 10. In a case where the recording format used by the optical disk 11 is a zone constant angular velocity (ZCAV), for example, the spindle motor 10 is rotated at a constant velocity. The ODC 5 carries out processes necessary for a data read and a data write.

The LD unit 12 has a known structure made up of a laser diode (LD) and a monitoring detector. A tracking error signal (TES) and a focus error signal (FES) which are detected by the LD unit 12 are supplied to the DSP 4. The DSP 4 supplies a tracking control signal to the positioner 8 via the driver 7 based on the TES, so as to carry out a tracking servo operation. In addition, the DSP 4 supplies a focus control signal to the lens actuator 9 via the driver 7 based on the FES, so as to carry out a focus servo operation.

The write LSI circuit 13 is provided in a write system with respect to the ODC 5, and has a known structure made up of a write modulator and a LD controller. During the data write, the write LSI circuit 13 supplies a LD driving signal to the LD within the LD unit 12, based on a write clock and write data which are obtained via the ODC 5 and the bus 15. The write modulator converts the write data into a data format in conformance with a pit position modulation (PPM) recording system or a pulse width modulation (PWM) recording system. On the other hand, the read LSI circuit 14 is provided in a read system with respect to the ODC 5, and has a known structure made up of a read demodulator and a frequency synthesizer. During the data read, the read LSI circuit 14 receives a detection signal from the monitoring detector within the LD unit 12. The read LSI circuit 14 generates a read clock and read data based on the detection signal, and supplies the read clock and the read data to the ODC 4 via the bus 15. In this state, the read demodulator within the read LSI circuit 14 demodulates the read PPM data or PWM data back into the original NRZ data.

As will be described later, the read data from the read LSI circuit 14 is subjected to a decoding process and an error detecting and correcting process within the ODC 5, before being transferred to the host unit via the bus 6, the DRAM 2 and the host interface. On the other hand, the write data is subjected to an encoding process within the ODC 5, before being supplied to the write LSI circuit 13 via the bus 15.

A detection signal from the temperature sensor 16 is supplied to the MPU 1 via the DSP 4. Accordingly, the MPU 12 can control the light emission power of the LD within the LD unit 12 to optimum values for the read, write and erase by a known method, based on an environmental temperature within the optical disk unit detected by the temperature sensor 16.

This embodiment is characterized by the operation of the ODC 5. Accordingly, the basic structure of the optical disk unit is not limited to that shown in FIG. 1, and various other known basic structures may of course be used for the optical disk unit instead of the basic structure shown in FIG. 1.

Figure 2:
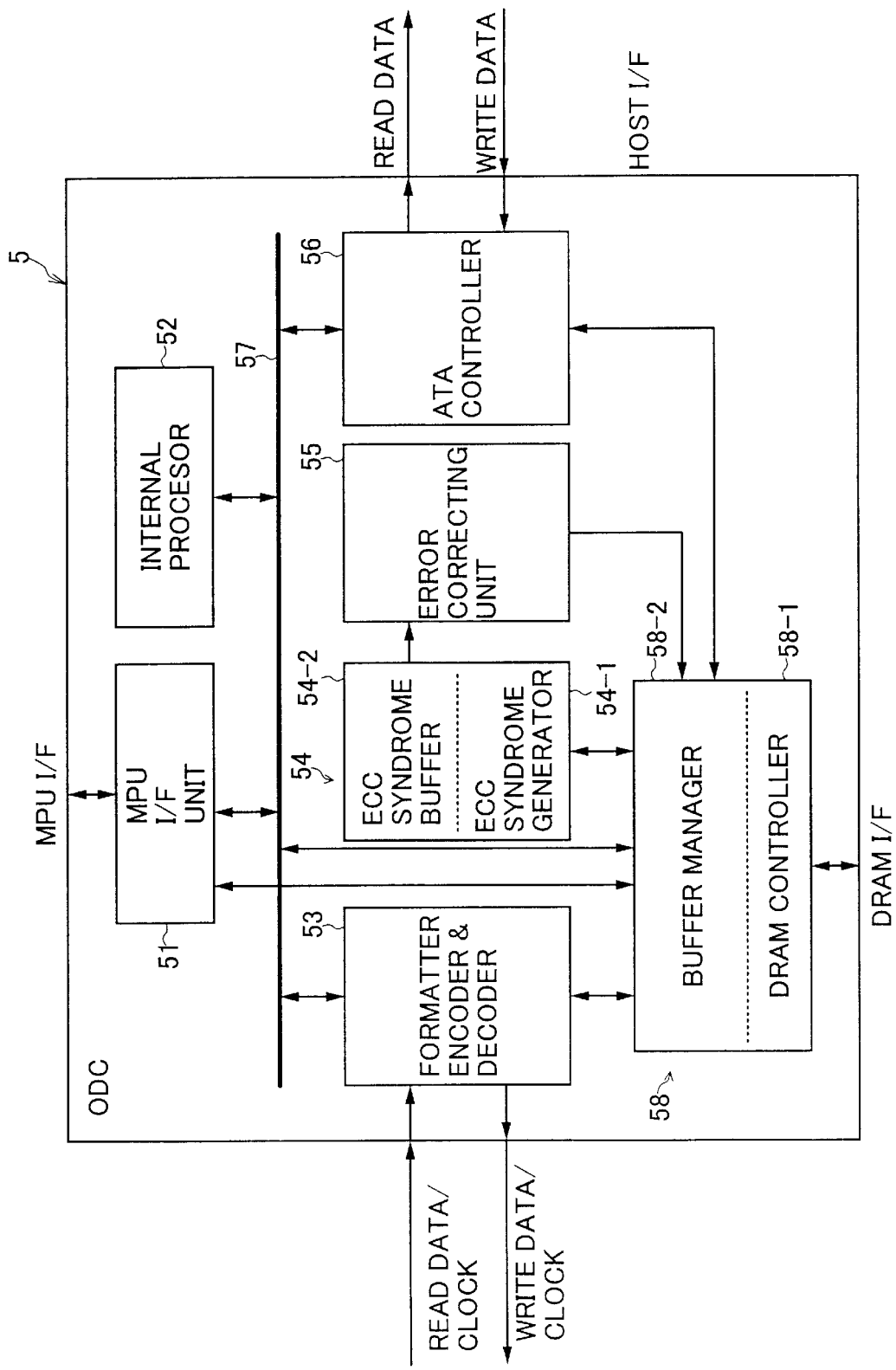
FIG. 2 is a system block diagram showing the structure of an optical disk controller.

FIG. 2 is a system block diagram showing the structure of the ODC 5 shown in FIG. 1. The ODC 5 shown in FIG. 2 generally includes a MPU interface unit 51, an internal processor 52, a formatter encoder & decoder 53, an ECC processor 54, an error correcting unit 55, an ATA controller 56, a bus 57, and a DRAM unit 58. The ECC processor 54 includes an ECC syndrome generator 54-1 and an ECC syndrome buffer 54-2. In addition, the DRAM unit 58 includes a DRAM controller 58-1 and a buffer manager 58-2. The MPU interface unit 51, the internal processor 52, the formatter encoder & decoder 53, the ATA controller 56 and the DRAM unit 58 are connected via the bus 57.

The MPU interface unit 51 is connected to the MPU 1 via a MPU interface and the bus 6. The internal processor 52 controls various parts within the ODC 5. The formatter encoder & decoder 53 encodes the write data and decodes the read data. The formatter encoder & decoder 53 supplies the write clock and the write data to the write LSI circuit 13 via the bus 15, and receives the read clock and the read data from the read LSI circuit 14 via the bus 15.

During the data write, the formatter encoder & decoder 53 generates the recording format by dividing the NRZ write data from the host unit into sector units of the optical disk 11. In addition, the ECC processor 54 generates the ECC in sector write data units, adds the ECC to the NRZ write data, and further generates and adds a cyclic redundancy check (CRC) code if necessary. The ECC is generated by the ECC syndrome generator 54-1, and is stored in the ECC syndrome buffer 54-2. Moreover, the ECC processor 54 converts the sector data with the encoded ECC into a 1–7 run length limited (RLL) code, for example.

On the other hand, during the data read, the ECC processor 54 carries out a 1–7 RLL reverse conversion with respect to the read data (sector data) from the read LSI circuit 14. After carrying out the CRC in the ECC processor 54, the error correcting unit 55 carries out an error detecting and correcting process using the ECC. Furthermore, the formatter encoder & decoder 53 connects the NRZ data in the sector units to form a stream of the NRZ read data, and transfers the read data to the host unit.

The ATA controller 56 controls the exchange of the commands and the data between the optical disk unit and the host unit via the host interface. The DRAM unit 58 is connected to the DRAM 2 via a DRAM interface and the bus 6. The DRAM controller 58-1 controls access to the DRAM 2, and the buffer manager 58-2 manages the data stored within the DRAM 2.

Figure 3:
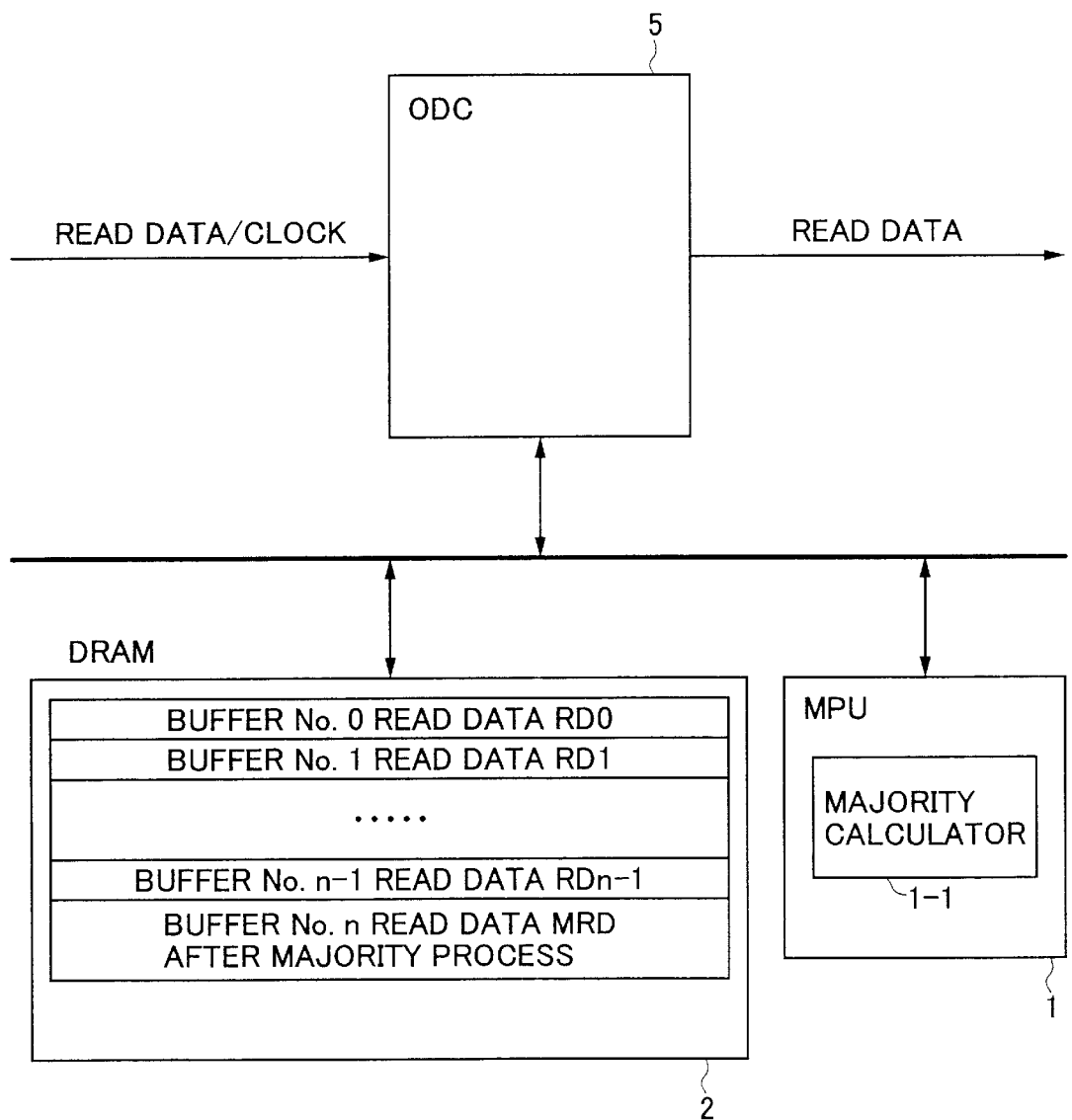
FIG. 3 is a system block diagram showing an important part of the first embodiment for explaining a majority process.

FIG. 3 is a system block diagram showing an important part of this first embodiment for explaining a majority process. In FIG. 3, those parts which are the same as those corresponding parts in FIG. 1 are designated by the same reference numerals, and a description thereof will be omitted.

During the data read, the MPU 1 carries out a control to read the same data from the same sector region on the optical disk 11 a plurality of times, for example. Read data RD0 through RDn-1 which are obtained via the read LSI circuit 14 by carrying out the read n times, for example, are stored in regions within the DRAM 2 having buffer numbers 0 through n-1 as shown in FIG. 3, under the management of the buffer manager 58-2 and under the control of the DRAM controller 58-1. A majority calculator 1-1 within the MPU 1 compares the read data RD0 through RDn-1 stored in the DRAM 2 in units of one or a plurality of bits, to carry out a majority calculation (hereinafter referred to as a majority process) which generates read data made up of data values having the highest frequency for each unit based on the comparison results. A read data MRD which is obtained after the majority process is stored in a region within the DRAM 2 having a buffer number n, under the management of the buffer manager 58-2 and under the control of the DRAM controller 58-1. In the ODC 5, the error detecting and correcting operation is carried out by the ECC processor 54 and the error correcting unit 55 with respect to the read data MRD which is obtained after the majority process. The read data corrected of the error is transferred to the host unit via the host interface.

Figure 4:
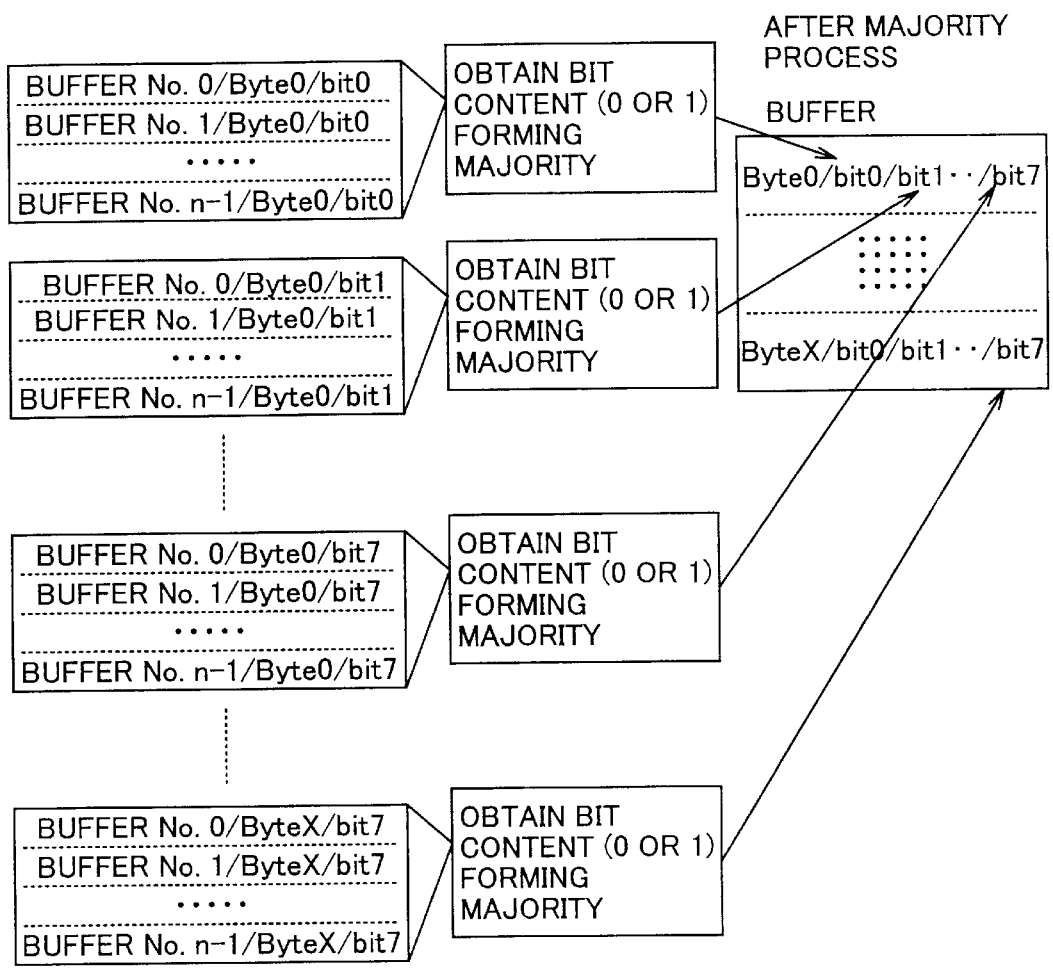
FIG. 4 is a diagram for explaining a majority read process for a case where a comparing unit is 1 bit.

FIG. 4 is a diagram for explaining a majority read process for a case where the comparing unit is 1 bit. In FIG. 4, it is assumed for the sake of convenience that each of the read data RD0 through RDn-1 is made up of bytes Byte0 through ByteX, and each of the bytes Byte0 through ByteX is made up of bits bit0 through bit7. As described above, the read data DR0 through RDn-1 are stored in the regions within the DRAM 2 having the buffer numbers 0 through n-1. Accordingly, in the case where the comparing unit is 1 bit, the majority process which sequentially obtains a logic value "0" or "1" forming the majority from the first bit bit0 to the last bit b7 for each of the buffer numbers 0 through n-1 is carried out with respect to the first byte Byte0, and each majority bit is stored in the buffer number n. Such a majority process is similarly carried out for the next byte Byte1 to the last byte ByteX, with respect to each of the read data RD0 through RDn-1.

Figure 5:
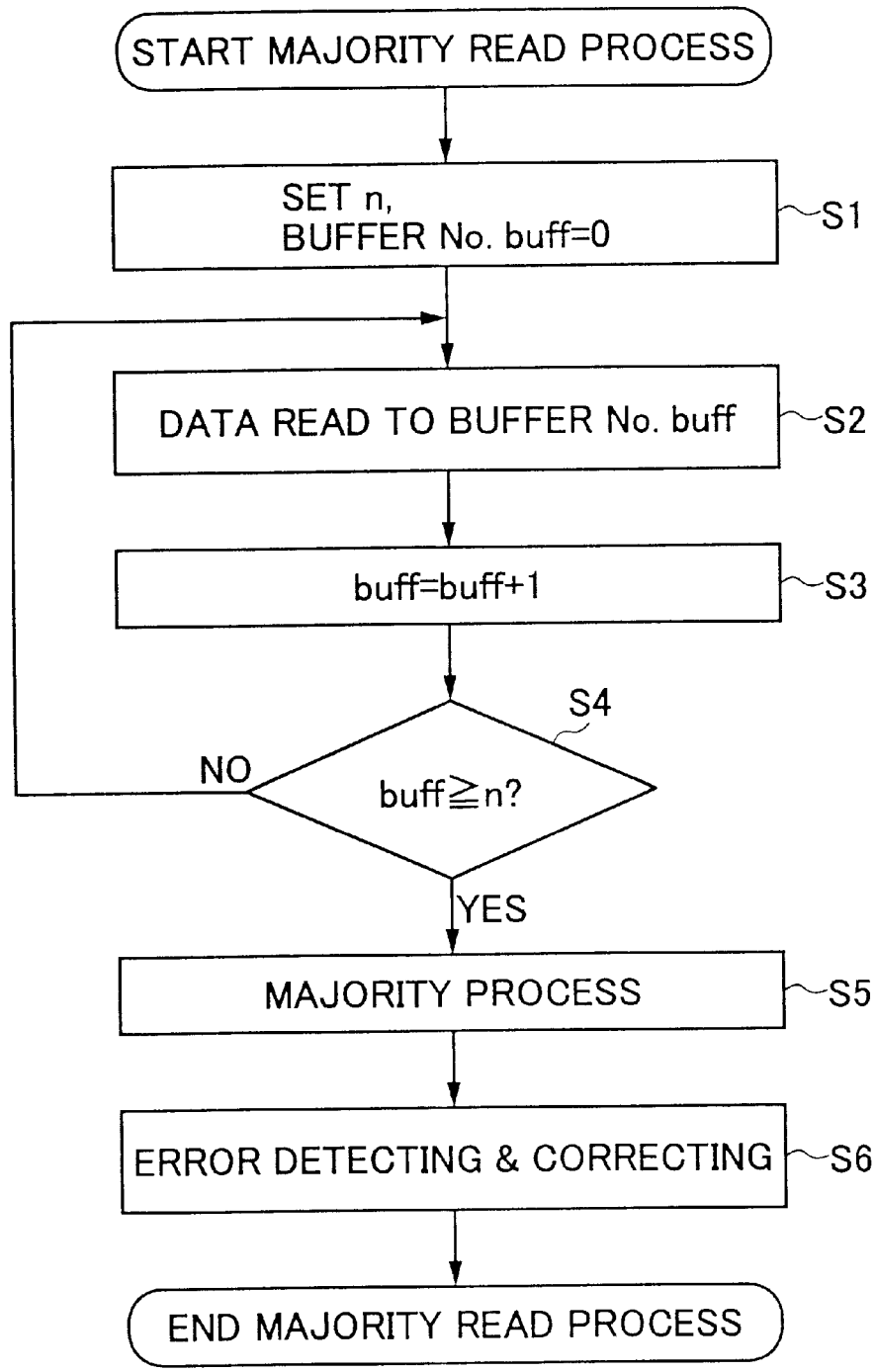
FIG. 5 is a flow chart for explaining the majority read process.

FIG. 5 is a flow chart for explaining the majority read process. When the majority read process is started, a step S1 shown in FIG. 5 sets the value of n which indicates the number of times the read is to be carried out, and sets a buffer number buff within the DRAM 2 to buff=0. A step S2 writes the read data in the region within the DRAM 2 having the buffer number buff. A step S3 increments the buffer number buff by one. A step S4 decides whether or not buff≧n, so as to determine whether or not the data read is carried out n times. The process returns to the step S2 if the decision result in the step S4 is NO. On the other hand, if the decision result in the step S4 is YES, a step S5 carries out the majority process described above in conjunction with FIG. 4 in the case where the comparing unit is 1 bit. After the step S5, a step S6 carries out the error detecting and correcting process in the error correcting unit 55 with respect to the read data which has been subjected to the majority process, and the majority read process ends.

Figure 6:
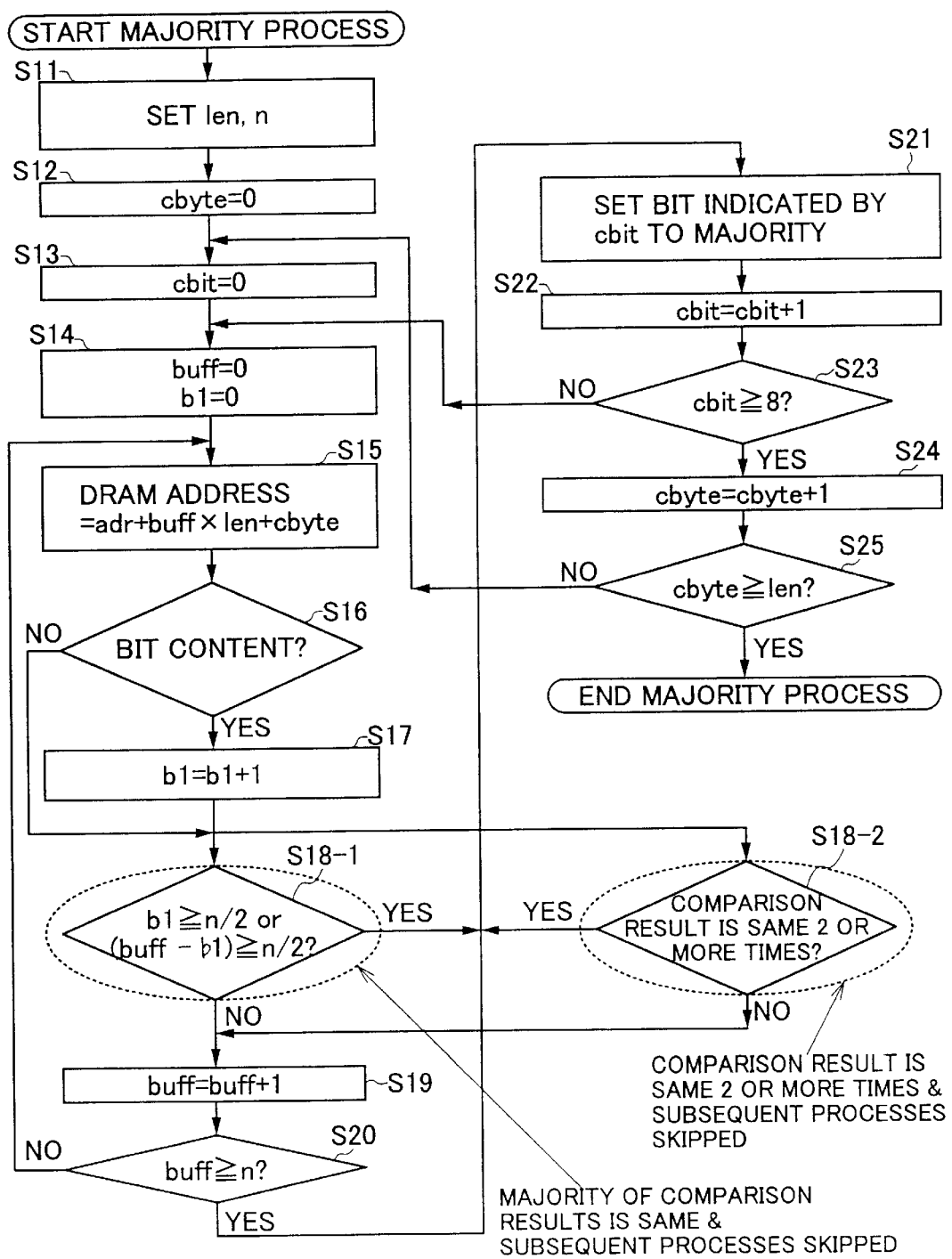
FIG. 6 is a flow chart for explaining the majority read process for the case where the comparing unit is 1 bit.

FIG. 6 is a flow chart for explaining the majority process for the case where the comparing unit is 1 bit, that is, for explaining the majority process of the step S5 shown in FIG. 5. When the majority process is started, a step S11 shown in FIG. 6 sets the value of len indicating the number of byes in one sector on the optical disk 11, and sets the value of n which indicates the number of times the read is to be carried out. A step S12 sets a comparing byte position counter cbyte within the MPU 1 to cbyte=0, and a step S13 sets a comparing bit (1-bit) position counter cbit within the MPU 1 to cbit=0. In addition, a step S14 sets the buffer number buff to buff=0, and sets the value of b1 which indicates the number of bits having the bit content "1" to b1=0.

A step S15 reads the read data at an address of the DRAM 2 indicated by adr+buff×len+cbyte as a work variable. A step S16 decides whether or not the bit content indicated by the comparing bit (1-bit) position counter cbit is "1". The process advances to a step S18-1 or S18-2 which will be described later if the decision result in the step S16 is NO. On the other hand, if the decision result in the step S16 is YES, a step S17 increments the number b1 of bits having the bit content "1" by one, and the process advances to the step S18-1 or S18-2.

The step S18-1 is carried out when the majority of the comparison results is the same and subsequent processes are to be skipped. In other words, the step S18-1 decides whether or not b1≧n/2 or (buff−b1)≧n/2. On the other hand, the step S18-2 is carried out when the same comparison result is obtained two or more times and the subsequent processes are to be skipped. The step S18-2 decides whether or not the same comparison result is obtained two or more times. Accordingly, one of the steps S18-1 and S18-2 is selectively carried out depending on the required processing speed. If the decision result in the step S18-1 or S18-2 is YES, the process advances to a step S21 which will be described later. On the other hand, if the decision result in the step S18-1 or S18-2 is NO, a step S19 increments the buffer number buff by one, and a step S20 decides whether or not buff≧n, so as to determine whether or not the data read is carried out n times. The process returns to the step S15 if the decision result in the step S20 is NO. If the decision result in the step S20 is YES, the process advances to the step S21.

The step S21 sets the bit at the position indicated by the comparing bit (1-bit) position counter cbit in the storage region (buffer number buff=n) of the read data which has been subjected to the majority process to the logic value "0" or "1" which forms the majority as result of the comparison. In addition, a step S22 increments the comparing bit (1-bit) position counter cbit by one, and a step S23 decides whether or not cbit≧8, so as to determine whether or not the process is carried out for 8 bits. The process returns to the step S14 if the decision result in the step S23 is NO.

A step S24 increments the comparing byte position counter cbyte by one, and a step S25 decides whether or not cbyte≧len, so as to determine whether or not the process is carried out for one sector. The process returns to the step S13 if the decision result in the step S25 is NO. On the other hand, the majority process ends if the decision result in the step S25 is YES.

Figure 7:
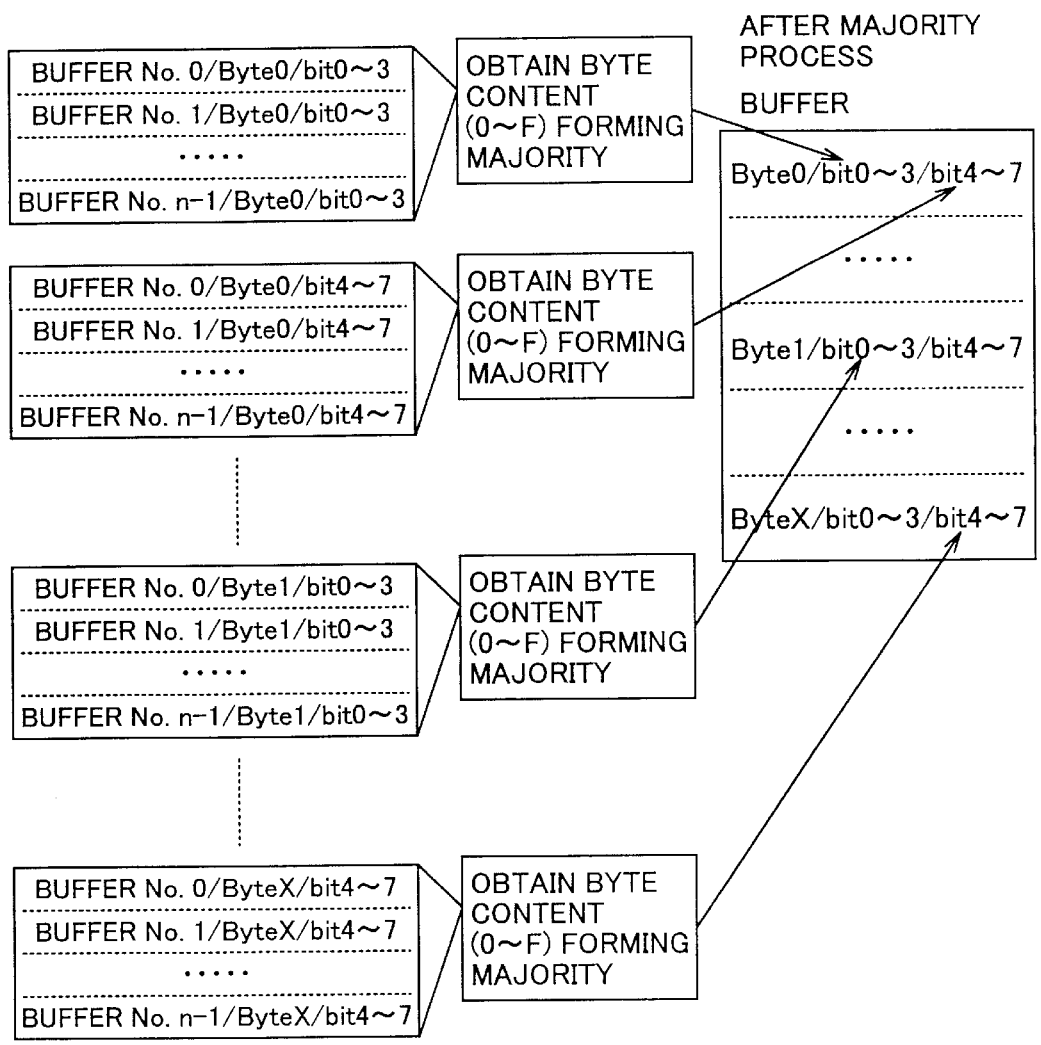
FIG. 7 is a diagram for explaining the majority read process for a case where the comparing unit is 4 bits.

FIG. 7 is a diagram for explaining the majority read process for a case where the comparing unit is 4 bits. In FIG. 7, it is assumed for the sake of convenience that each of the read data RD0 through RDn−1 is made up of bytes Byte0 through ByteX, and each of the bytes Byte0 through ByteX is made up of bits bit0 through bit7, similarly to the case shown in FIG. 4. As described above, the read data DR0 through RDn−1 are stored in the regions within the DRAM 2 having the buffer numbers 0 through n−1. Accordingly, in the case where the comparing unit is 4 bits, the majority process which sequentially obtains one of values "0" through "F" forming the majority from the first four bits bit0 through bit3 to the last four bits b4 through b7 for each of the buffer numbers 0 through n−1 is carried out with respect to the first byte Byte0, and each majority bit is stored in the buffer number n. Such a majority process is similarly carried out for the next byte Byte1 to the last byte ByteX, with respect to each of the read data RD0 through RDn−1.

Figure 8:
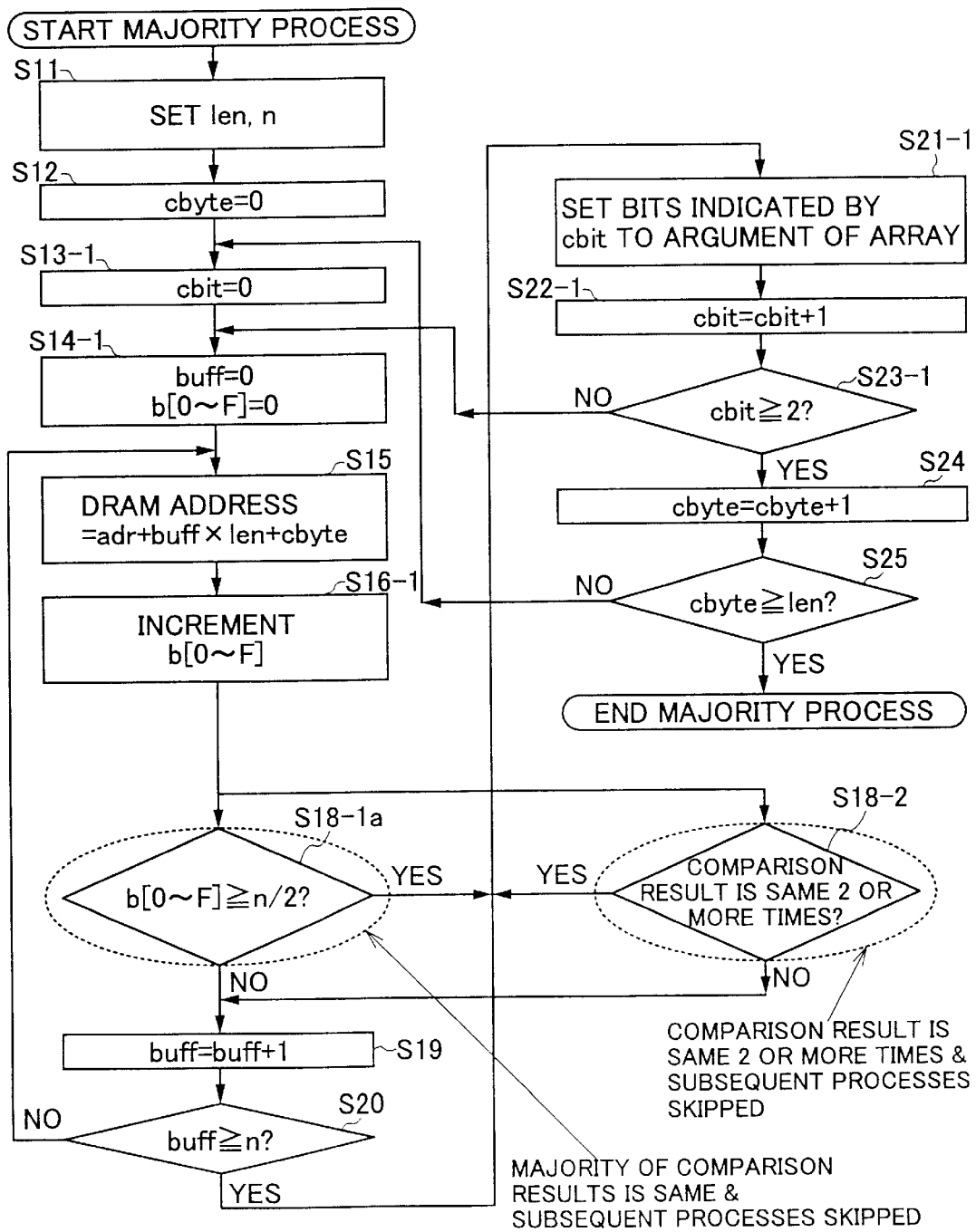
FIG. 8 is a flow chart for explaining the majority read process for the case where the comparing unit is 4 bits.

FIG. 8 is a flow chart for explaining the majority read process for the case where the comparing unit is 4 bits, that is, for explaining the majority process of the step S5 shown in FIG. 5. In FIG. 8, those steps which are the same as those corresponding steps in FIG. 6 are designated by the same reference numerals, and a description thereof will be omitted.

In FIG. 8, a step S13-1 sets the comparing bit (4-bit) position counter cbit to cbit=0. A step S14-1 sets the buffer number buff to buff=0, and sets an array b[0 to F] indicating the number of 4-bit contents (0 to F) to b[0 to F]=0. A step S16-1 increments by one the value of the array b[0 to F] having as the argument the value of the lower byte when the comparing bit (4-bit) position counter cbit is cbit=0 and the value of the upper byte when cbit=1. For example, in a case where the comparing bit (4-bit) position counter cbit is cbit=0 and the value of a work variable value is DB, the step S16-1 sets b[B]=b[B]+1. In addition, a step S18-1a is carried out when the majority of the comparison results is the same and subsequent processes are to be skipped. In other words, the step S18-1a decides whether or not b[0 to F]≧n/2.

A step S21-1 sets the four bits, that is, the upper or lower byte portion, at the position indicated by the comparing bit (4-bit) position counter cbit in the storage region (buffer number buff=n) of the read data which has been subjected to the majority process to the argument of the array which forms the majority of b[0] through b[F] as result of the comparison. For example, if b[0]=1, b[1]=0, b[5]=10, ..., b[F]=0, the result of the majority is "5". In addition, a step S22-1 increments the comparing bit (4-bit) position counter cbit by one, and a step S23-1 decides whether or not cbit≧2, so as to determine whether or not the processing amounting to eight bits is carried out. Other steps are the same as those shown in FIG. 6.

Figure 9:
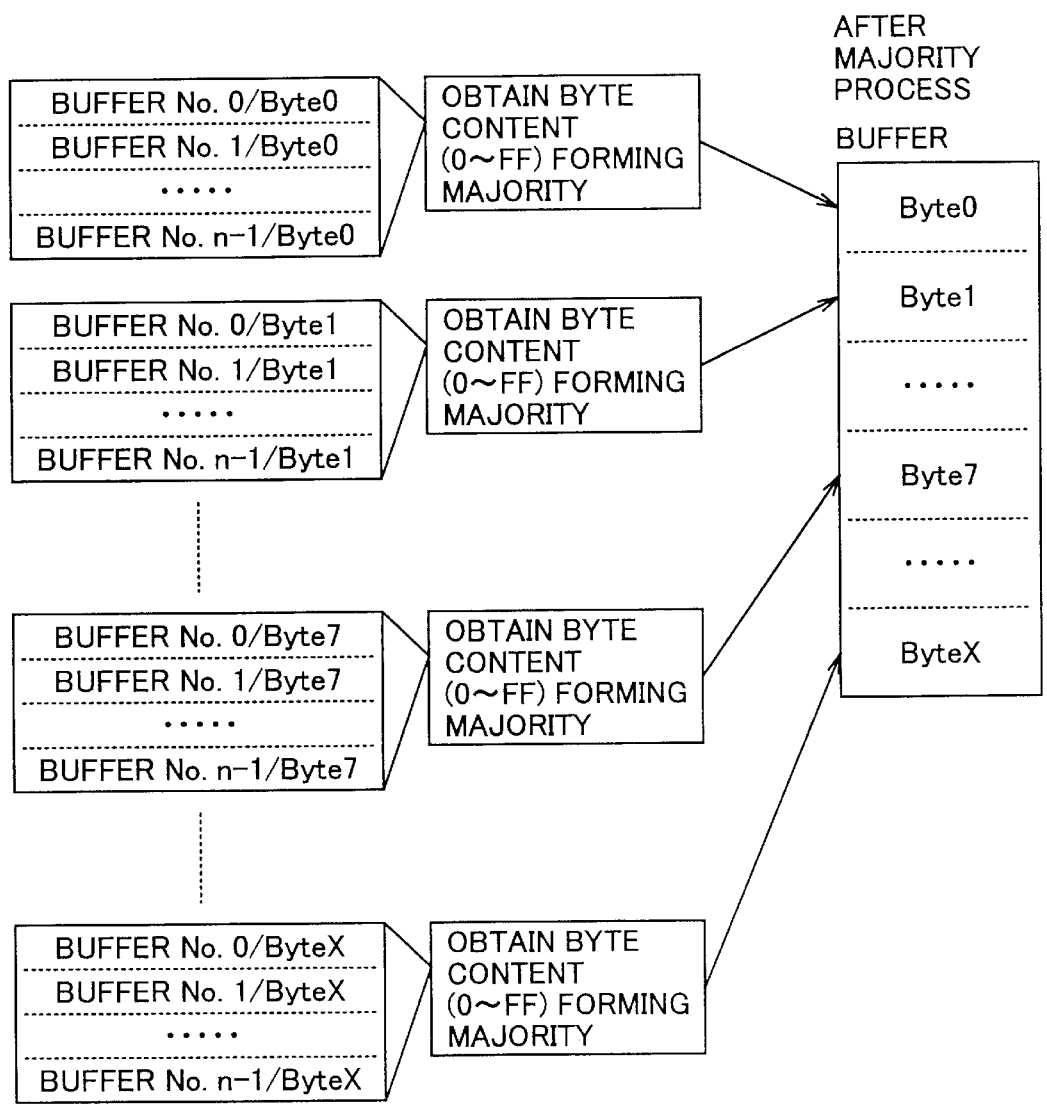
FIG. 9 is a diagram for explaining the majority read process for a case where the comparing unit is 1 byte.

FIG. 9 is a diagram for explaining a majority read process for a case where the comparing unit is 1 byte. In FIG. 9, it is assumed for the sake of convenience that each of the read data RD0 through RDn−1 is made up of bytes Byte0 through ByteX. As described above, the read data DR0 through RDn−1 are stored in the regions within the DRAM 2 having the buffer numbers 0 through n−1. Accordingly, in the case where the comparing unit is 1 byte, the majority process which sequentially obtains one of values "0" to "FF" forming the majority from the first byte Byte0 for each of the buffer numbers 0 through n−1 is carried out, and each majority bit is stored in the buffer number n. Such a majority process is similarly carried out for the next byte Byte1 to the last byte ByteX, with respect to each of the read data RD0 through RDn−1.

Figure 10:
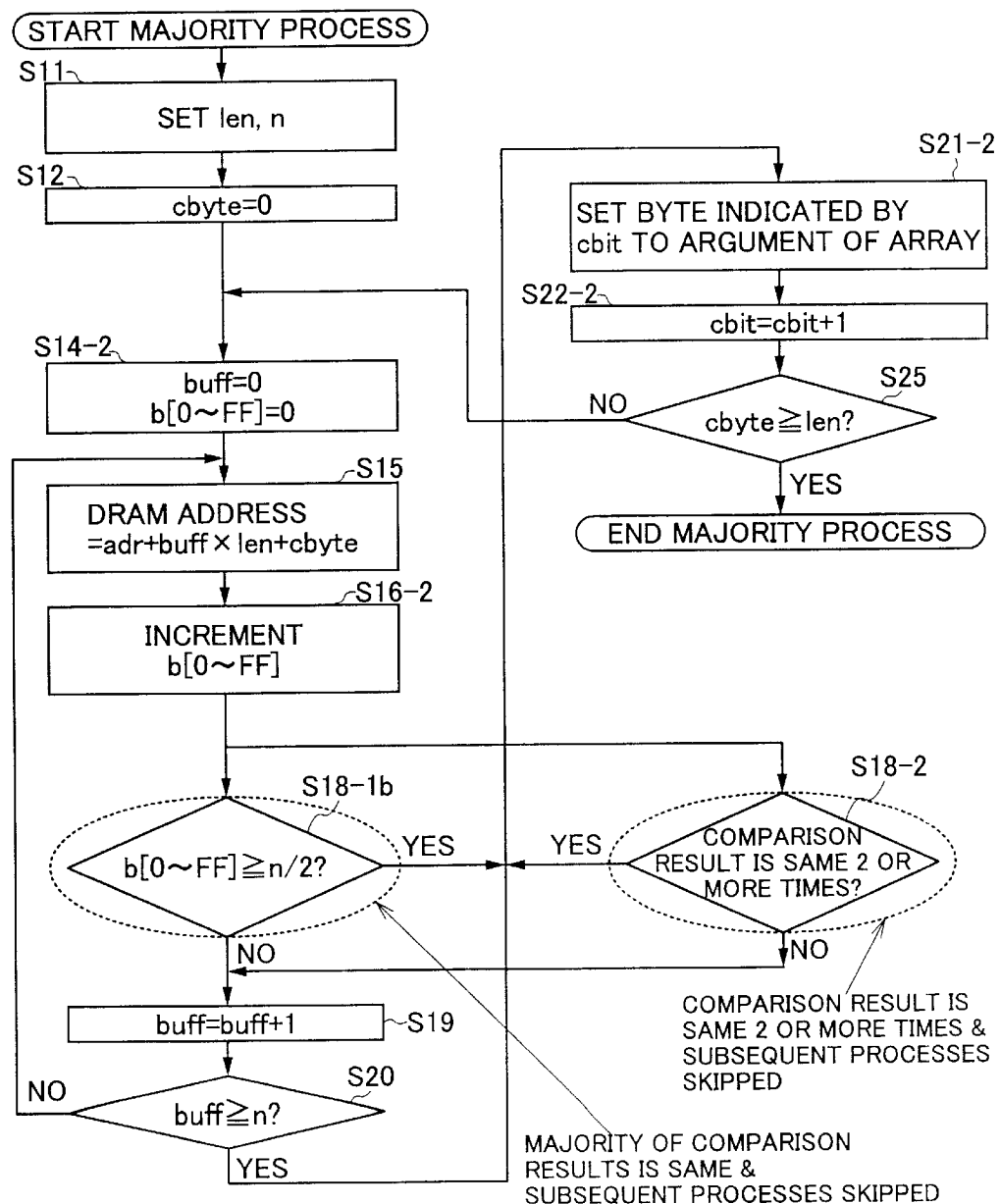
FIG. 10 is a flow chart for explaining the majority read process for the case where the comparing unit is 1 byte.

FIG. 10 is a flow chart for explaining the majority read process for the case where the comparing unit is 1 byte, that is, for explaining the majority process of the step S5 shown in FIG. 5. In FIG. 10, those steps which are the same as those corresponding steps in FIG. 8 are designated by the same reference numerals, and a description thereof will be omitted.

In FIG. 10, a step S14-2 sets the buffer number buff to buff=0, and sets an array b[0 to FF] indicating the number of 1-byte contents (0 to FF) to b[0 to FF]=0. A step S16-2 increments by one the value of the array b[0 to FF] having as the argument the value of the work variable. For example, in a case where the value of the work variable value is DB, the step S16-2 sets b[DB]=b[DB]+1. In addition, a step S18-1b is carried out when the majority of the comparison results is the same and subsequent processes are to be skipped. In other words, the step S18-1b decides whether or not b[0 to FF]≧n/2.

A step S21-2 sets the one byte, at the position indicated by the comparing byte position counter cbyte in the storage region (buffer number buff=n) of the read data which has been subjected to the majority process to the argument of the array which forms the majority of b[0] through b[FF] as result of the comparison. For example, if b[0]=1, b[1]=0, b[5]=10, . . . , b[FF]=0, the result of the majority is "5". In addition, a step S22-2 increments the comparing byte position counter cbyte by one, and the process advances to the step S25. Other steps are the same as those shown in FIG. 8.

Next, a description will be given of a second embodiment of the data read method according to the present invention. This second embodiment of the data read method is employed in a second embodiment of the storage apparatus according to the present invention. The basic structure of this second embodiment of the storage apparatus may be the same as that of the first embodiment of the storage apparatus described above, and an illustration and description thereof will be omitted. In addition, in third and subsequent embodiments of the data read method according to the present invention which will be described later, corresponding embodiments of the storage apparatus according to the present invention may have the same basic structure as the first embodiment of the storage apparatus, and thus, a description of the storage apparatus will be omitted.

In this second embodiment of the data read method, the comparing unit (the number of comparing bits) is increased if the comparison results of the majority process are consecutively the same, and the comparing unit (the number of comparing bits) is decreased if the comparison results of the majority process are consecutively different. Since the number of processes becomes smaller as the number of comparing bits used by the majority process becomes larger, this embodiment can improve the processing speed.

Figure 11:
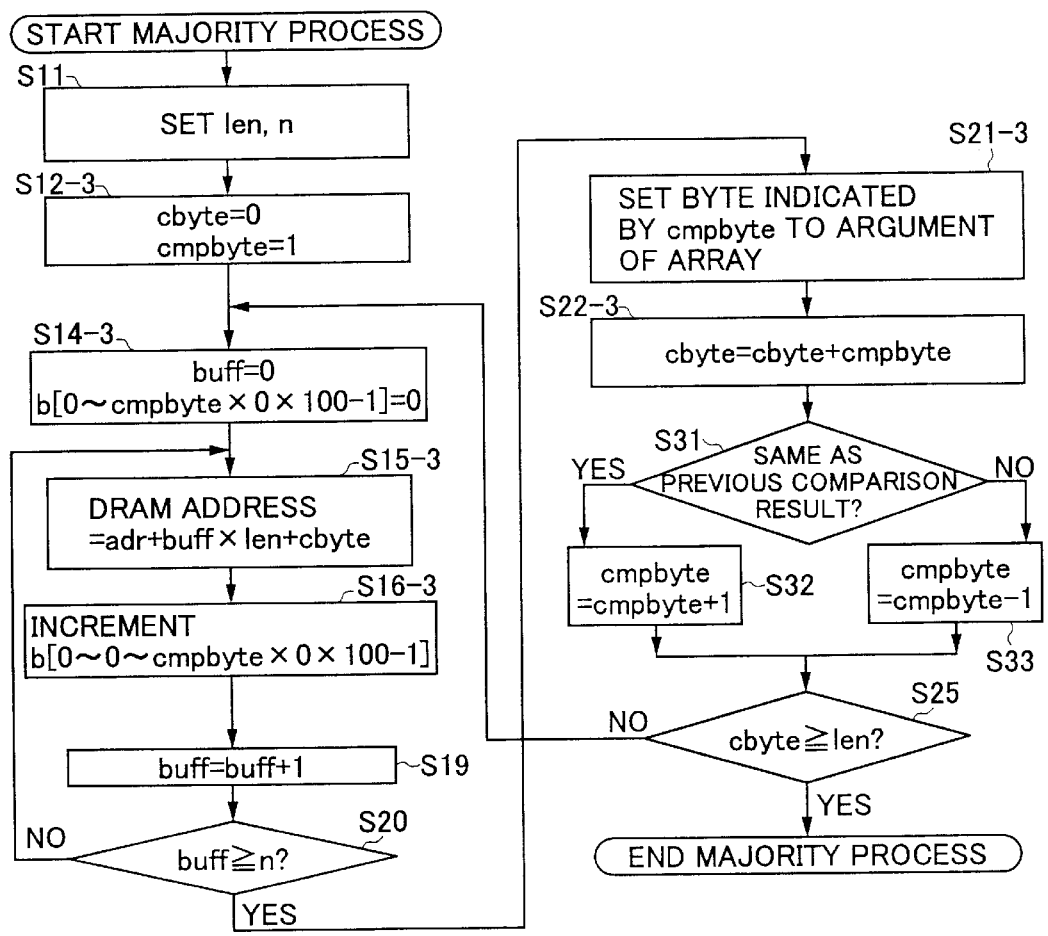
FIG. 11 is a flow chart for explaining the majority process in a second embodiment of a data read method according to the present invention.

FIG. 11 is a flow chart for explaining the majority process of this second embodiment of the data read method. In FIG. 11, those steps which are the same as those corresponding steps in FIG. 6 are designated by the same reference numerals, and a description thereof will be omitted. For the sake of convenience, it is assumed in this embodiment that the number of comparing bits is increased and decreased in units of eight bits, that is, one byte.

In FIG. 11, a step S12-3 sets the comparing byte position counter cbyte within the MPU 1 to cbyte=0, and sets a number cmpbyte of comparison bytes to cmpbyte=1. A step S14-3 sets the buffer number buff to buff=0, and sets an array b[0 to cmpbyte×0×100−1] which indicates the number of contents (0 to cmpbyte×0×100−1) amounting to the number cmpbyte of comparison bytes to "0".

A step S15-3 reads the read data at an address of the DRAM 2 indicated by adr+buff×len+cybte as a work variable. A step S16-3 sets the contents amounting to the number cmpbyte of comparing bytes at the position indicated by the comparing byte position counter cbyte in the storage region (buffer number buff=n) of the read data which has been subjected to the majority process to the argument of the array which forms the majority of b[0] through b[cmpbyte× 0×100−1]. For example, in a case where b[0]=1, b[1]=0, b[7D3B]=10, . . . , b[cmpbyte×0×100−1]=0, the result of the majority is "7D3B". In addition, a step S22-3 increases the comparing byte position counter cbyte by the number cmpbyte of comparing bytes, and the process advances to a step S31.

The step S31 decides whether or not the present comparison result and the previous comparison result match. If the decision result in the step S31 is YES, a step S32 increments the number cmpbyte of comparing bytes by one, and the process advances to the step S25. On the other hand, if the decision result in the step S31 is NO, a step S33 decrements the number cmpbyte of comparing bytes by one, and the process advances to the step S25. The step S25 decides whether or not cbyte≧len, so as to determine whether or not the process is carried out for one sector. The majority process ends if the decision result in the step S25 is YES.

Next, a description will be given of a third embodiment of the data read method according to the present invention. In this third embodiment of the data read method, the majority read process is carried out when a retry process fails even by changing retry parameters.

Figure 12:
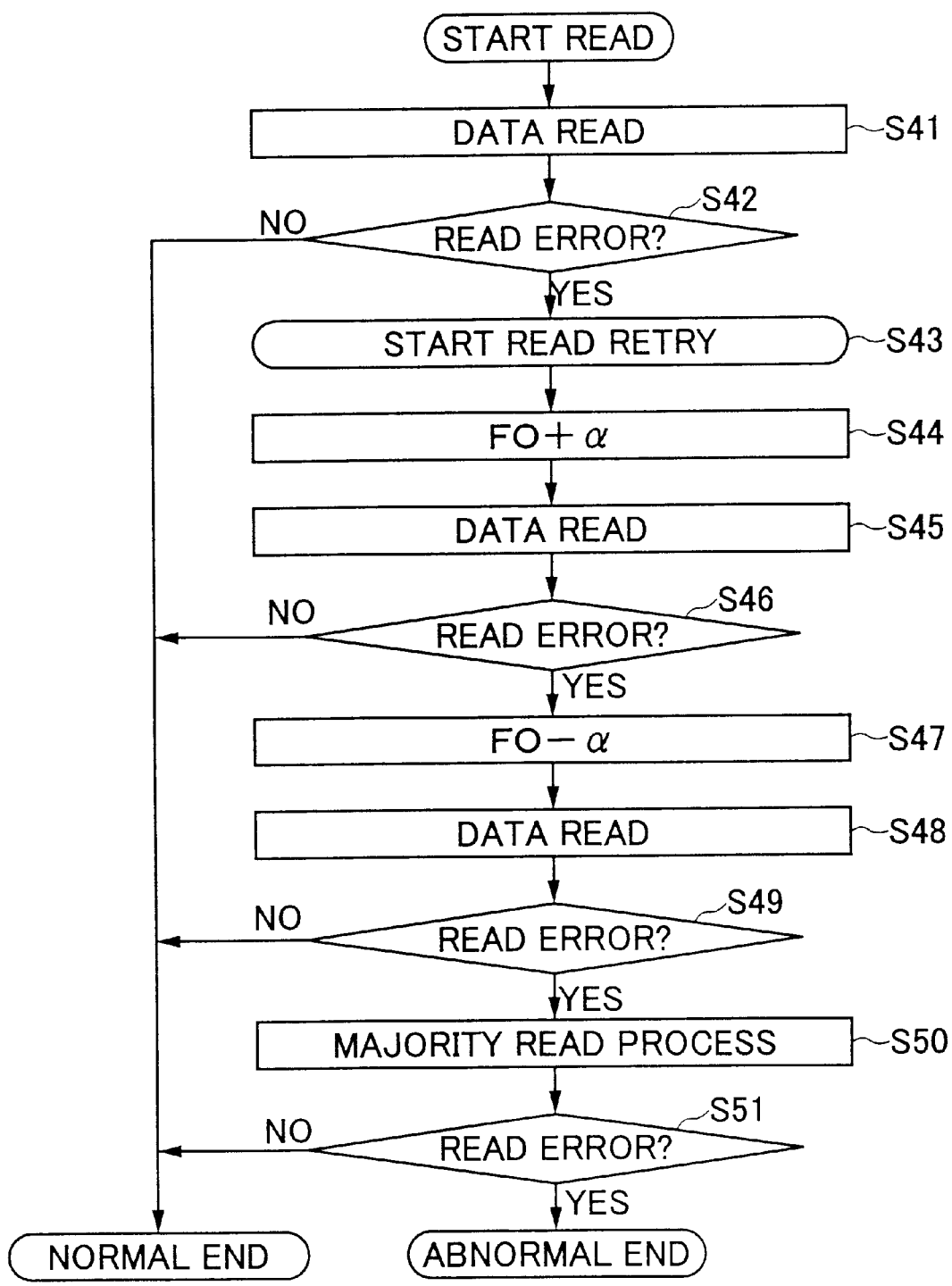
FIG. 12 is a flow chart for explaining a process of a third embodiment of the data read method according to the present invention.

FIG. 12 is a flow chart for explaining a process of this third embodiment of the data read method. When a read process is started a step S41 shown in FIG. 12 carries out a data read process, and a step S42 decides whether or not a read error is generated. The read process ends normally if the decision result in the step S42 is NO. On the other hand, if the decision result in the step S42 is YES, a step S43 starts a read retry process.

A step S44 increases a focus offset quantity FO by a set value α, and a step S45 carries out a data read process. A step S46 decides whether or not a read error is generated. The read process ends normally if the decision result in the step S46 is NO. On the other hand, if the decision result in the step S46 is YES, a step S47 decreases the focus offset quantity FO by the set value α, and a step S48 carries out a data read process. A step S49 decides whether or not a read error is generated, and the read process ends normally if the decision result in the step S49 is NO.

If the decision result in the step S49 is YES, a step S50 carries out any one of the majority read processes described above in conjunction with the first embodiment. In addition, a step S51 decides whether or not a read error is generated, and the read process ends normally if the decision result in the step S51 is NO. The read process ends abnormally if the decision result in the step S51 is YES.

In this embodiment, the focus offset quantity FO is changed as the retry parameter. However, the retry parameter is of course not limited to the focus offset quantity FO. In addition, a plurality of retry parameters may be changed.

Next, a description will be given of a fourth embodiment of the data read method according to the present invention. In this fourth embodiment of the data read method, the majority read process is carried out when the read retry process fails, and the number of comparing bits used for the majority read process is successively increased depending on the generated read error. For this reason, this embodiment can positively remedy even a read error which cannot be remedied by the read retry process.

Figure 13:
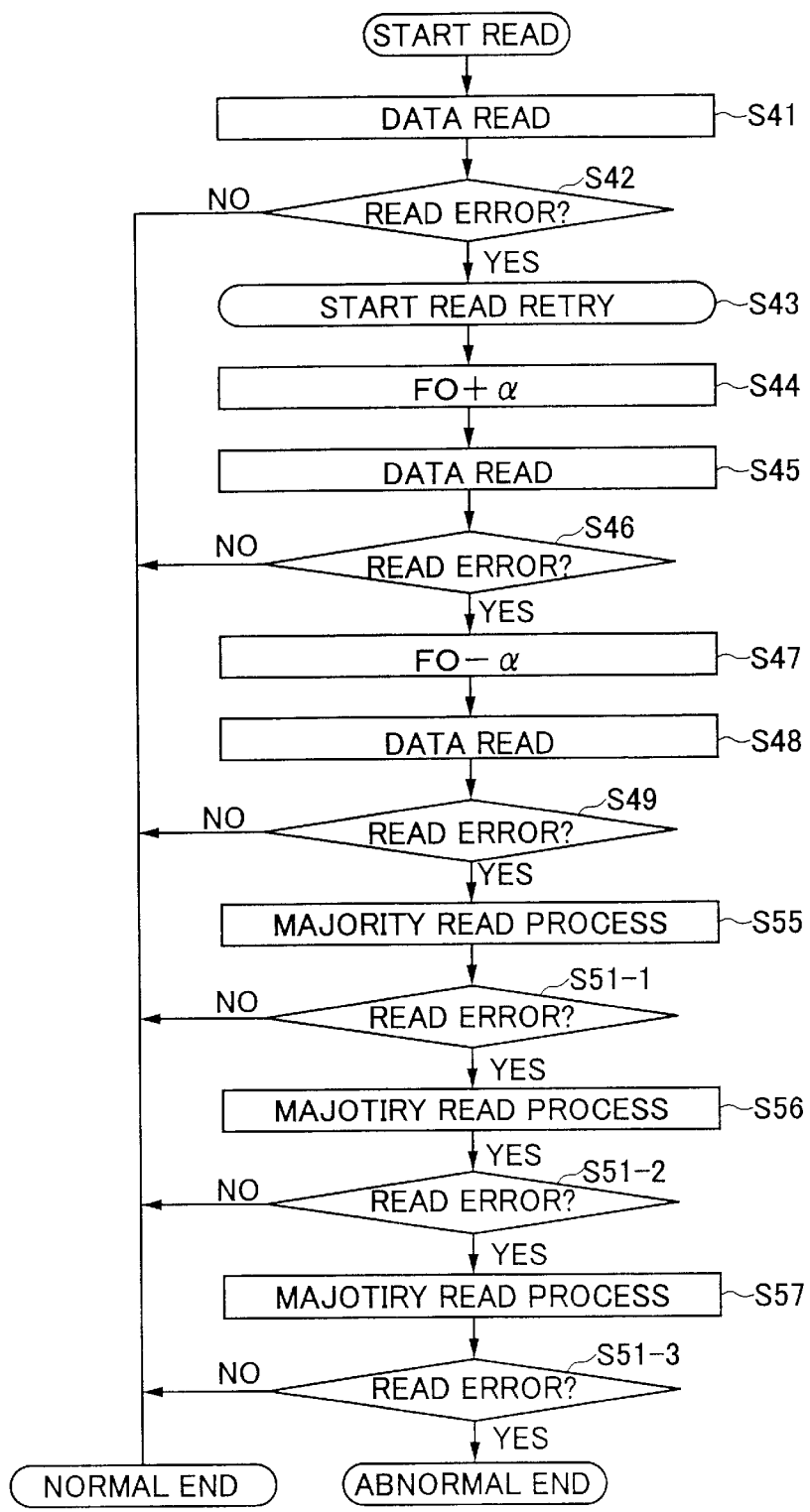
FIG. 13 is a flow chart for explaining a process of a fourth embodiment of the data read method according to the present invention.

FIG. 13 is a flow chart for explaining a process of this fourth embodiment of the data read method. In FIG. 13, those steps which are the same as those corresponding steps in FIG. 12 are designated by the same reference numerals, and a description thereof will be omitted.

In FIG. 13, if the decision result in the step S49 is YES, a step S55 carries out the majority read process for the case where the number of comparing bits is one, as described above in conjunction with FIG. 6. A step S51-1 decides whether or not a read error is generated, and the read process ends normally if the decision result in the step S51-1 is NO. On the other hand, if the decision result in the step S51-1 is YES, a step S56 carries out the majority read process for the case where the number of comparing bits is four, as described above in conjunction with FIG. 8. A step S51-2 decides whether or not a read error is generated, and the read process ends normally if the decision result in the step S51-2 is NO. On the other hand, if the decision result in the step S51-2 is YES, a step S57 carries out the majority read process for the case where the number of comparing bits is eight, that is, one byte, as described above in conjunction with FIG. 10. A step S51-3 decides whether or not a read error is generated, and the read process ends normally if the decision result in the step S51-3 is NO. On the other hand, the read process ends abnormally if the decision result in the step S51-3 is YES.

Next, a description will be given of a fifth embodiment of the data read method according to the present invention. In this fifth embodiment of the data read method, the majority read process is carried out if the read retry process fails, and the retry parameters are changed if a read error is generated even after the majority read process is carried out. According to this embodiment, it is possible to more positively remedy the read error which cannot be remedied by the read retry process.

Figure 14:
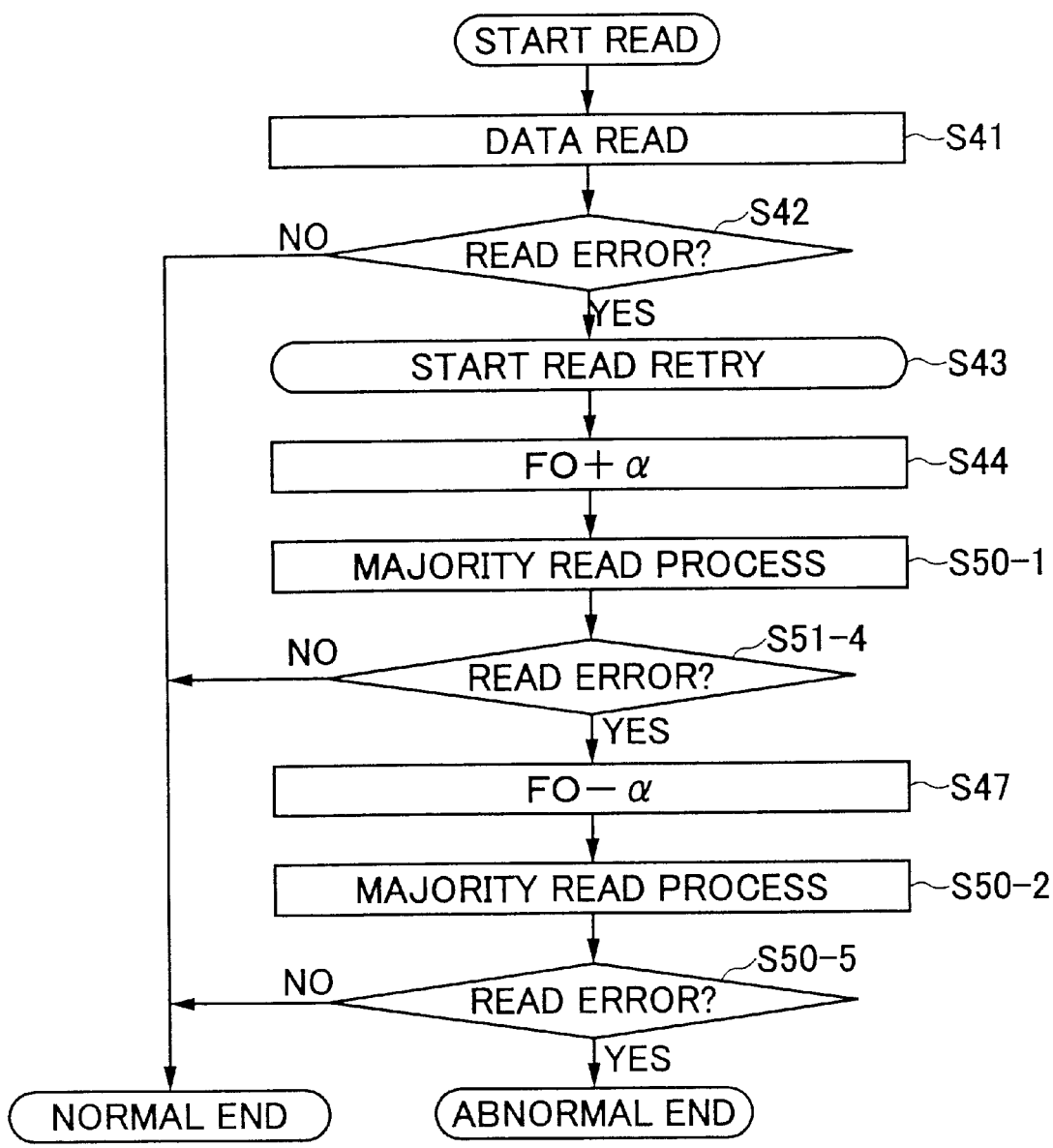
FIG. 14 is a flow chart for explaining a process of a fifth embodiment of the data read method according to the present invention.

FIG. 14 is a flow chart for explaining a process of this fifth embodiment of the data read method. In FIG. 14, those steps which are the same as those corresponding steps in FIG. 12 are designated by the same reference numerals, and a description thereof will be omitted.

In FIG. 14, after the step S44, a step S50-1 carries out any one of the majority read processes described above in conjunction with the first embodiment. In addition, a step S51-4 decides whether or not a read error is generated, and the read process ends normally if the decision result in the step S51-4 is NO. On the other hand, if the decision result in the step S51-4 is YES, the step S47 decreases the focus offset quantity FO by the set value α, and a step S50-2 thereafter carries out any one of the majority read processes described above in conjunction with the first embodiment. A step S51-5 decides whether or not a read error is generated, and the read process ends normally if the decision result in the step S51-5 is NO. On the other hand, the read process ends abnormally if the decision result in the step S51-5 is YES.

Next, a description will be given of a sixth embodiment of the data read method according to the present invention. In this sixth embodiment of the data read method, a combination of a retry process and a majority read process having a high success rate is carried out with priority. For this reason, this embodiment can more positively remedy a read error which cannot be remedied solely by the read retry process.

Figure 15:
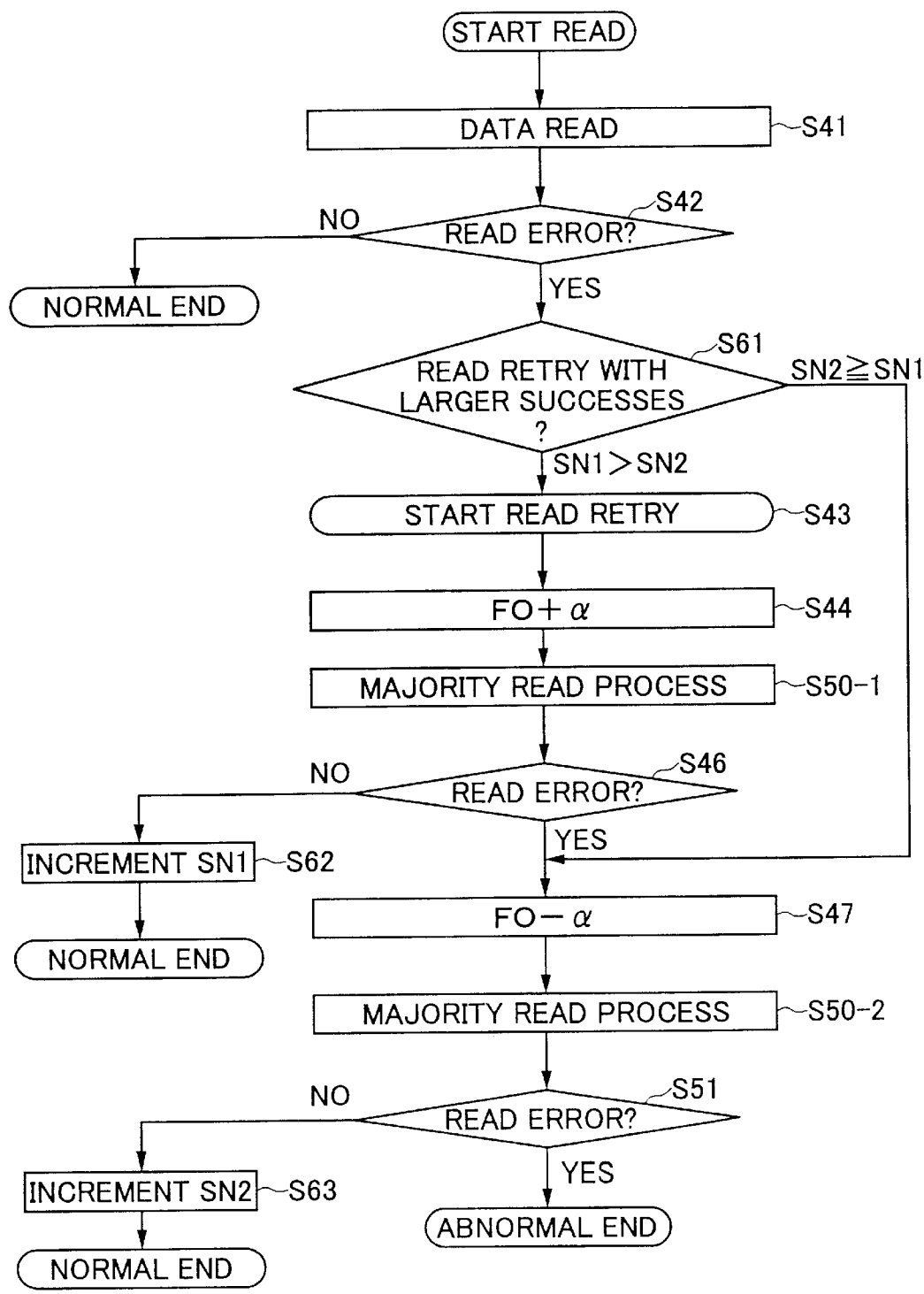
FIG. 15 is a flow chart for explaining a process of a sixth embodiment of the data read method according to the present invention.

FIG. 15 is a flow chart for explaining a process of this sixth embodiment of the data read method. In FIG. 15, those steps which are the same as those corresponding steps in FIGS. 12 and 14 are designated by the same reference numerals, and a description thereof will be omitted.

In FIG. 15, if the decision result in the step S42 is YES, a step S61 selects a read retry having a larger number of successes. In a case where a number SN1 of successes of a read retry RR1 which carries out a combination of a read retry which increases the focus offset quantity FO and a majority read process is larger than a number SN2 of successes of a read retry RR2 which carries out a combination of a read retry which decreases the focus offset quantity FO and a majority read process, the process advances to the step S43. On the other hand, if the number SN2 of successes is greater than or equal to the number SN1 of successes, the process advances to the step S47.

If the decision result in the step S46 is NO, a step S62 increments the number SN1 of successes by one, and the read process ends normally. In addition, if the decision result in the step S51 is NO, a step S63 increments the number SN2 of successes by one, and the read process ends normally.

Next, a description will be given of a seventh embodiment of the data read method according to the present invention. In this seventh embodiment of the data read method, a combination of a retry process in which an error correction using the ECC fails and a majority read process is carried out. For example, in a case where an off-track is generated during the data read, there is a high possibility that the off-track will also be generated during the majority read process. Since it is not very useful to carry out the majority read process when the off-track is generated, this embodiment carries out the majority read process only when the quality of the read data is poor such that the error correction fails. For this reason, this embodiment can more positively remedy a read error which cannot be remedied by a retry process in which the error correction fails.

Figure 16:
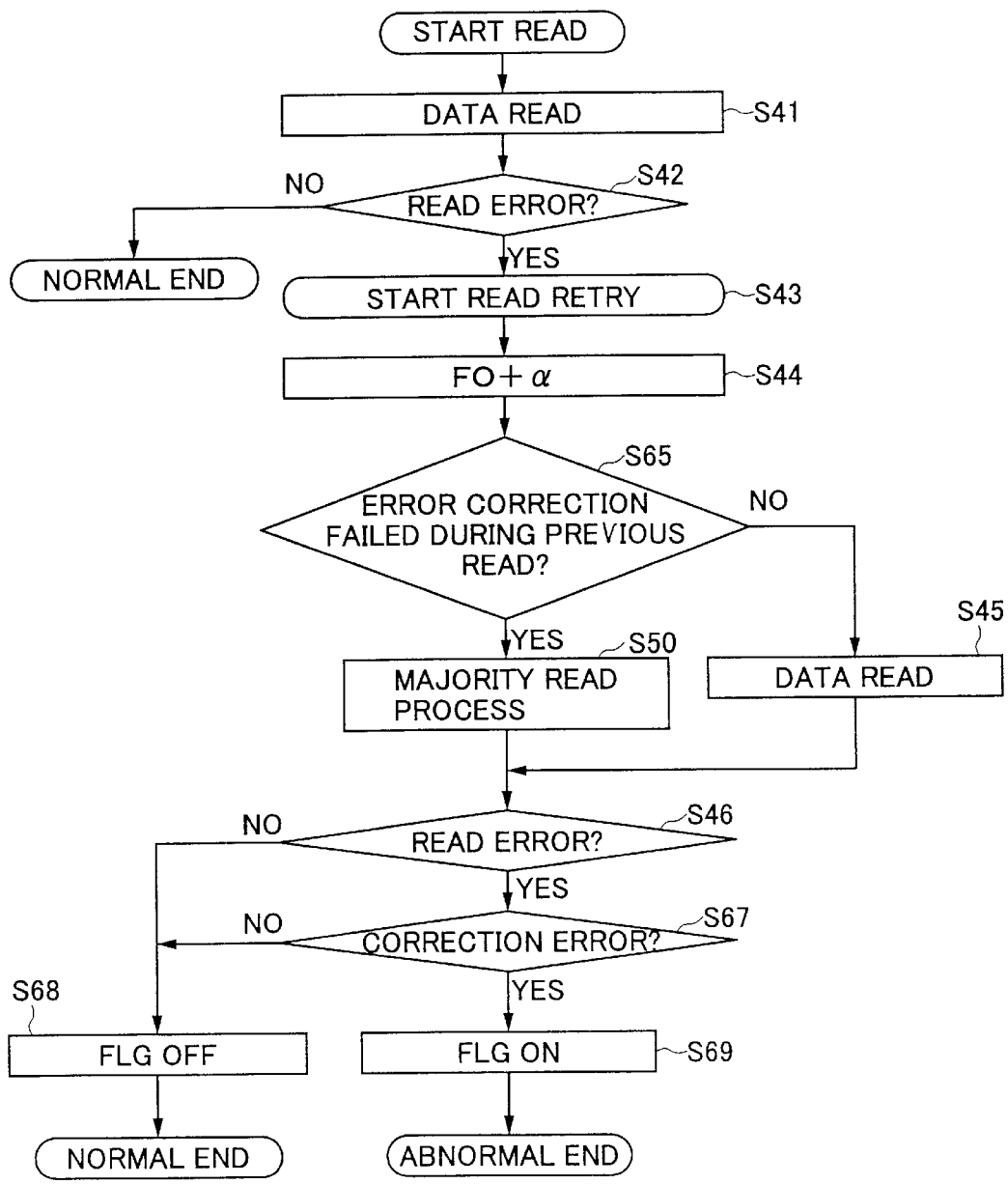
FIG. 16 is a flow chart for explaining a process of a seventh embodiment of the data read method according to the present invention.

FIG. 16 is a flow chart for explaining a process of this seventh embodiment of the data read method according to the present invention. In FIG. 16, those steps which are the same as those corresponding steps in FIG. 12 are designated by the same reference numerals, and a description thereof will be omitted.

In FIG. 16, after the step S44, a step S65 decides whether or not an error correction failed during a previous read process, based on a correction error flag FLG which will be described later. If the decision result in the step S65 is NO, the step S45 carries out the data read process before the process advances to the step S46. On the other hand, if the decision result in the step S65 is YES, the step S50 carries out the majority read process before the process advances to the step S46.

In addition, if the decision result in the step S46 is YES, a step S67 decides whether or not a correction error is generated. If the decision result in the step S46 or S67 is NO, a step S68 clears (turns OFF) the correction error flag FLG with respect to the read retry process which is carried out by increasing the focus offset quantity FO, and the read process ends normally. On the other hand, if the decision result in the step S67 is YES, a step S69 sets (turns ON) the correction error flag FLG with respect to the read retry process which is carried out by increasing the focus offset quantity FO, and the read process ends abnormally.

For the sake of convenience, FIG. 16 only shows the correction error flag FLG with respect to the read retry process which is carried out by increasing the focus offset quantity FO, but it is of course possible to carry out a similar process using a correction error flag with respect to the read retry process which is carried out by decreasing the focus offset quantity FO.

Next, a description will be given of an eighth embodiment of the data read method according to the present invention. In this eighth embodiment of the data read method, a majority read process is carried out immediately when an error correction using the ECC fails immediately before carrying out a read retry process. In other words, in a case where the quality of the read data is poor such that the error correction will fail, it is judged that the possibility of remedying the read error is higher for the majority read process than the read retry process, and the majority read process is carried out based on this judgement. Hence, according to this embodiment, it is possible to quickly remedy a read error which cannot be remedied by a read retry process in which the error correction will fail.

Figure 17:
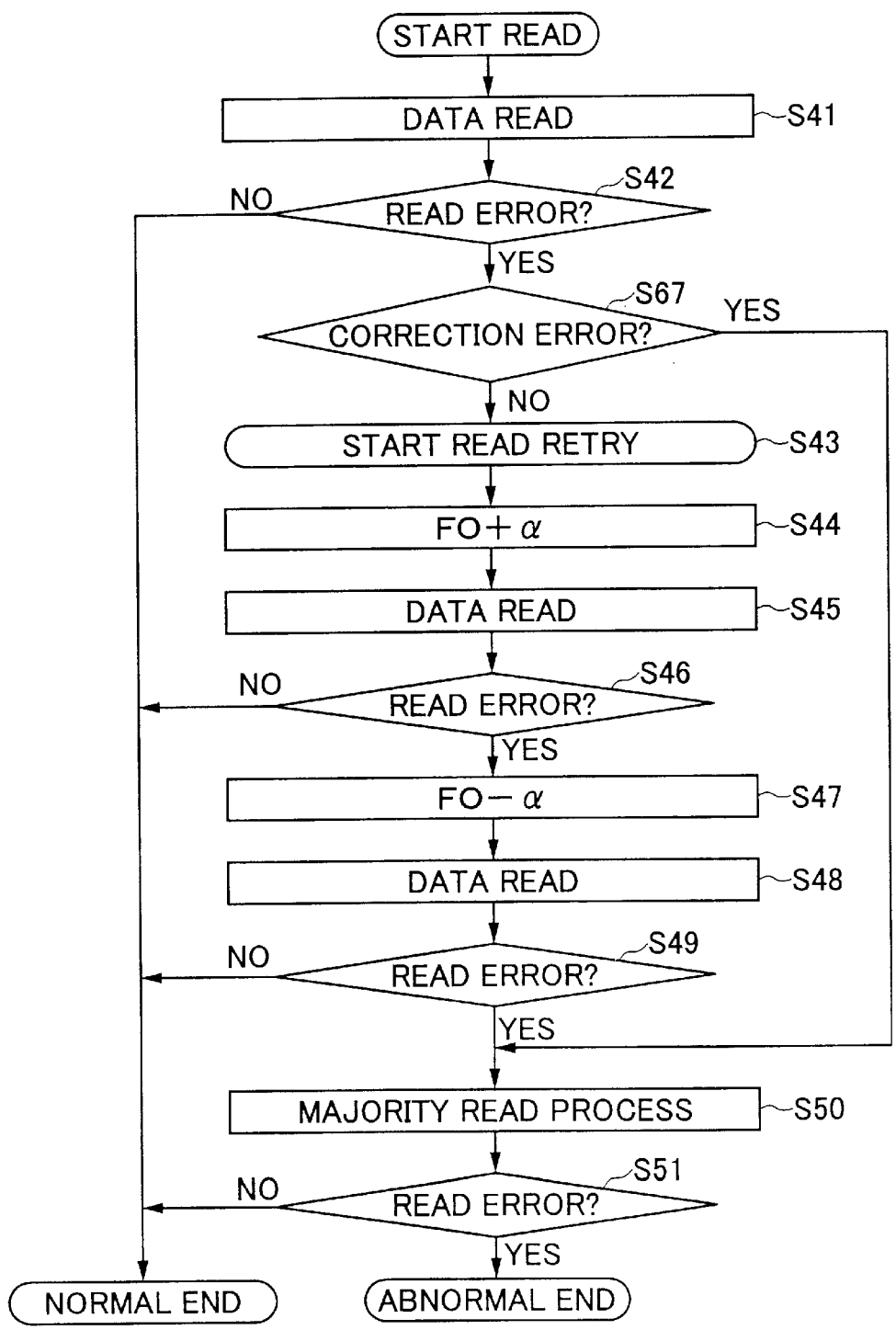
FIG. 17 is a flow chart for explaining a process of an eighth embodiment of the data read method according to the present invention.

FIG. 17 is a flow chart for explaining a process of this eighth embodiment of the data read method. In FIG. 17, those steps which are the same as those corresponding steps in FIG. 12 are designated by the same reference numerals, and a description thereof will be omitted.

In FIG. 17, if the decision result in the step S42 is YES, the step S67 decides whether or not the correction error is generated. The process advances to the step S43 if the decision result in the step S67 is NO. On the other hand, if the decision result in the step S67 is YES, the process advances to the step S50, and the majority read process is carried out immediately.

Next, a description will be given of a ninth embodiment of the data read method according to the present invention. In this ninth embodiment of the data read method, a majority read process is not carried out in combination with a read retry process if an error correction using the ECC is successful immediately before carrying out the read retry process. In other words, in a case where an off-track is generated during the data read, there is a high possibility that the off-track will also be generated during the majority read process. Since it is not very useful to carry out the majority read process when the off-track is generated, this embodiment carries out the majority read process only when the quality of the read data is poor such that the error correction immediately before carrying out the read retry process fails. For this reason, this embodiment can skip an unnecessary majority read process, to thereby improve the processing speed.

Figure 18:
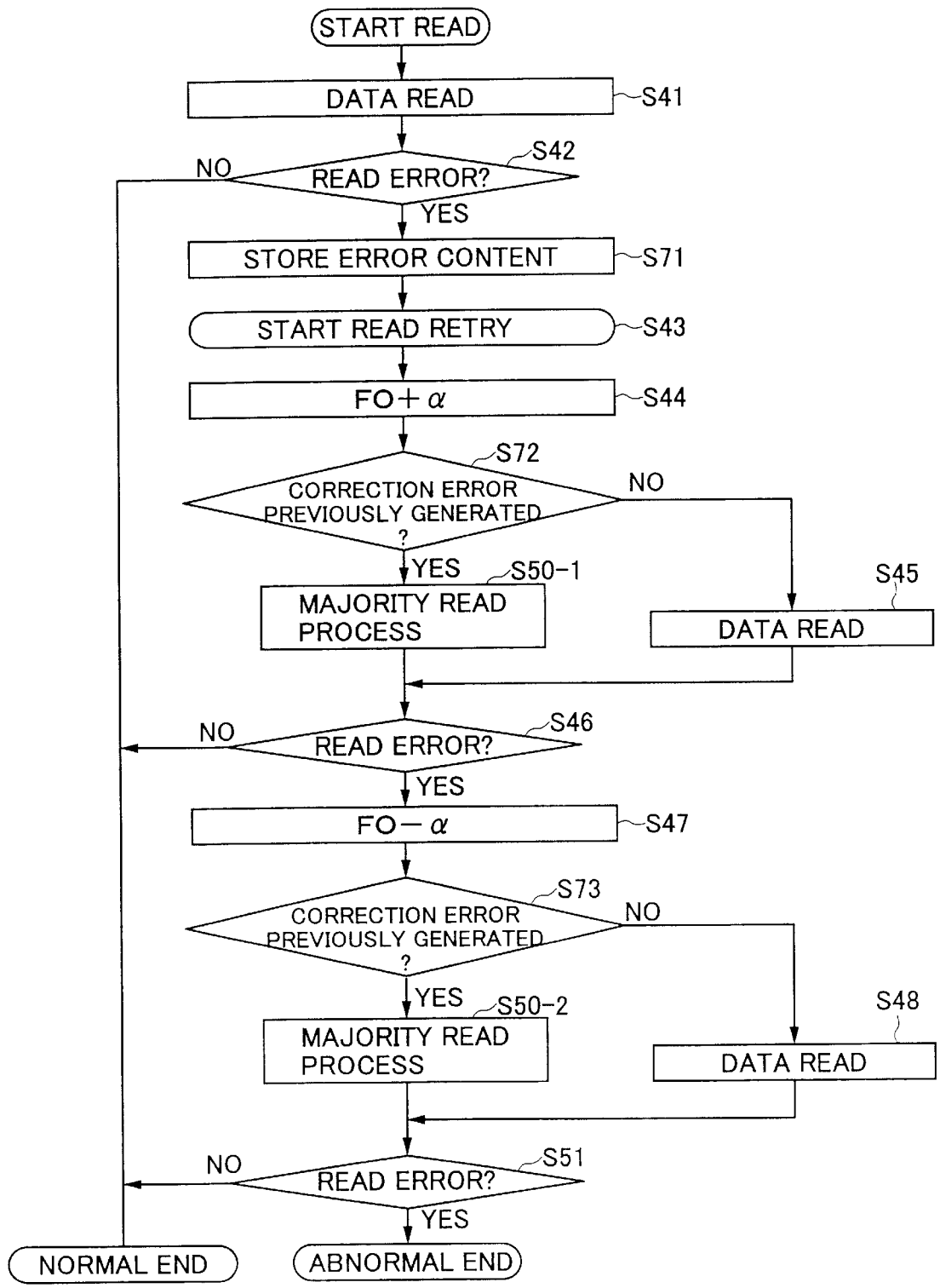
FIG. 18 is a flow chart for explaining a process of a ninth embodiment of the data read method according to the present invention.

FIG. 18 is a flow chart for explaining a process of this ninth embodiment of the data read method according to the present invention. In FIG. 18, those steps which are the same as those corresponding steps in FIGS. 12 and 15 are designated by the same reference numerals, and a description thereof will be omitted.

In FIG. 18, if the decision result in the step S42 is YES, a step S71 stores an error content, and the process advances to the step S43. After the step S44, a step S72 decides whether or not a correction error was generated previously, based on the stored error content. If the decision result in the step S72 is NO, the step S45 carries out a normal data read process, and the process advances to the step S46. On the other hand, if the decision result in the step S72 is YES, the step S50-1 carries out a majority read process, and the process advances to the step S46.

In addition, after the step S47, a step S73 decides whether or not a correction error was generated previously, based on the stored error content. If the decision result in the step S73 is NO, the step S48 carries out a normal data read process, and the process advances to the step S51. On the other hand, if the decision result in the step S73 is YES, a step S50-2 carries out a majority read process, and the process advances to the step S51.

Next, a description will be given of a tenth embodiment of the data read method according to the present invention. In this tenth embodiment of the data read method, the number of comparing bits used for the majority read process is set to a number of bits which results in a highest error remedying performance when the error correction is carried out. As a result, it is possible in this embodiment to optimize the error remedying performance.

Figure 19:
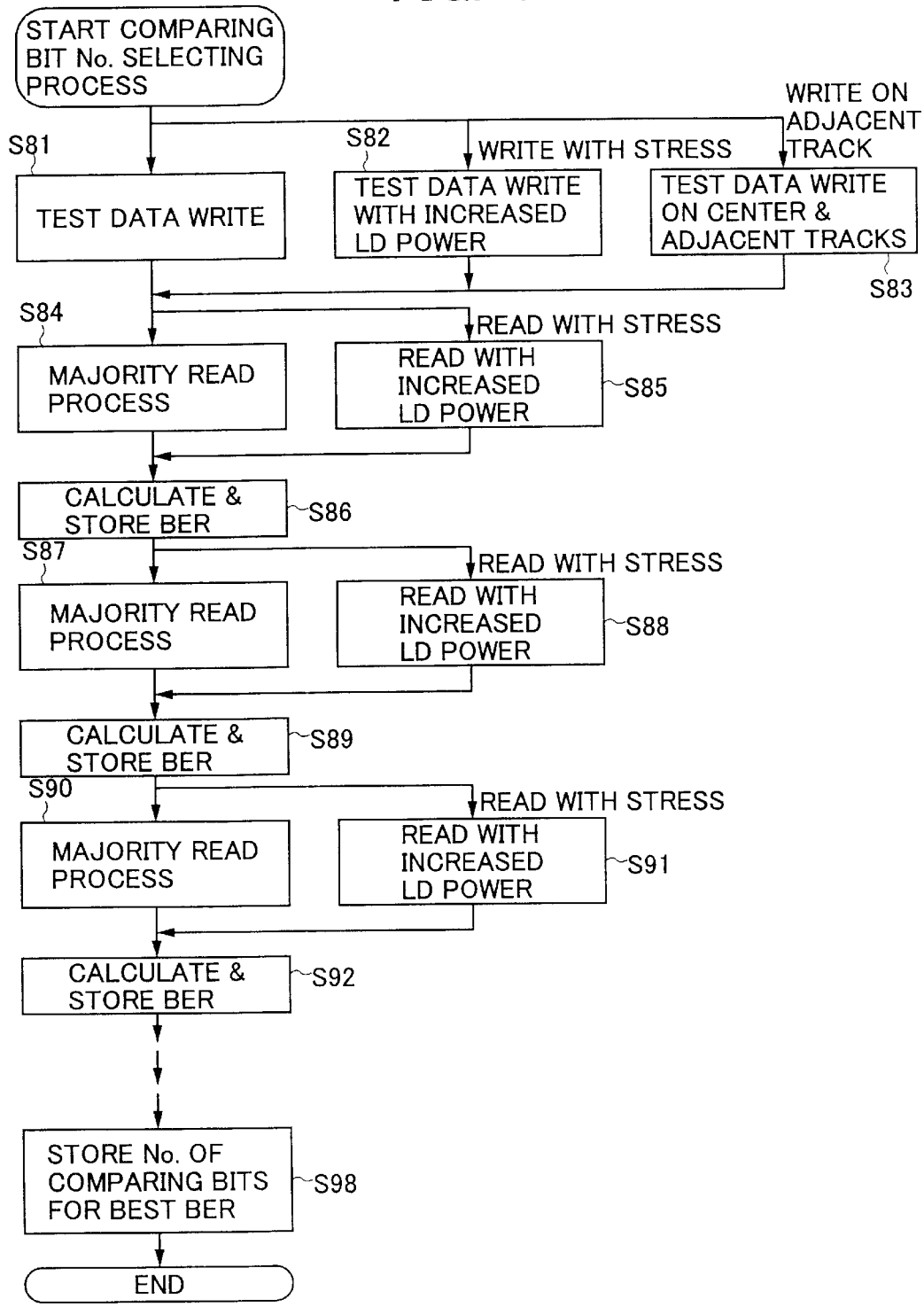
FIG. 19 is a flow chart for explaining a process of a tenth embodiment of the data read method according to the present invention.

FIG. 19 is a flow chart for explaining a process of this tenth embodiment of the data read method. More particularly, FIG. 19 shows a comparing bit number selecting process for selecting the number of comparing bits. When this comparing bit number selecting process is started, steps S81 through S83 shown in FIG. 19 are carried out in parallel. The step S81 carries out a data write process to write a prescribed test data. The step S82 carries out a data write process to write the test data in a state where a write LD power of the laser diode (LD) within the LD unit 12 is increased. In addition, the step S83 carries out a data write process to write the test data on a center track and an adjacent track on the optical disk 11. The step S82 is carried out to generate a state where stress is applied during the data write. On the other hand, the step S83 is carried out to generate a crosstalk from the adjacent track by also writing the test data on the adjacent track. By generating the stress or crosstalk in this manner, a difference between the error remedying performances is more easily generated due to a difference in the number of comparing bits.

After the steps S81 through S83, steps S84 and S85 are carried out in parallel. The step S84 carries out a majority read process by setting the number of comparing bits to one bit. In addition, the step S85 carries out a majority read process by setting the number of comparing bits to one bit, similarly to the step S85, but in a state where the LD power of the laser diode (LD) within the LD unit 12 is increased. The step S85 is carried out to generate a state where stress is applied during the data read process.

After the steps S84 and S85, a step S86 calculates and stores a bit error rate (BER).

After the step S86, steps S87 and S88 are carried out in parallel. The step S87 carries out a majority read process by setting the number of comparing bits to four bits. In addition, the step S88 carries out a majority read process by setting the number of comparing bits to four bits, similarly to the step S87, but in a state where the LD power of the laser diode (LD) within the LD unit 12 is increased. The step S88 is carried out to generate a state where stress is applied during the data read process.

After the steps S87 and S88, a step S89 calculates and stores the BER.

After the step S89, steps S90 and S91 are carried out in parallel. The step S90 carries out a majority read process by setting the number of comparing bits to eight bits (one byte). In addition, the step S91 carries out a majority read process by setting the number of comparing bits to eight bits (one byte), similarly to the step S90, but in a state where the LD power of the laser diode (LD) within the LD unit 12 is increased. The step S91 is carried out to generate a state where stress is applied during the data read process.

After the steps S90 and S91, a step S92 calculates and stores the BER.

Thereafter, it is possible to carry out processes for further increasing the number of comparing bits, and finally, a step S98 selects and stores an optimum number of comparing bits with which the best BER is obtained of the stored BERs. This optimum number of comparing bits is used for the majority read process which is next carried out.

Next, a description will be given of an eleventh embodiment of the data read method according to the present invention. In this eleventh embodiment of the data read method, the comparing bit number selecting process described above is carried out at the time of a media insertion, that is, when the optical disk 11 is inserted into the optical disk unit.

Figure 20:
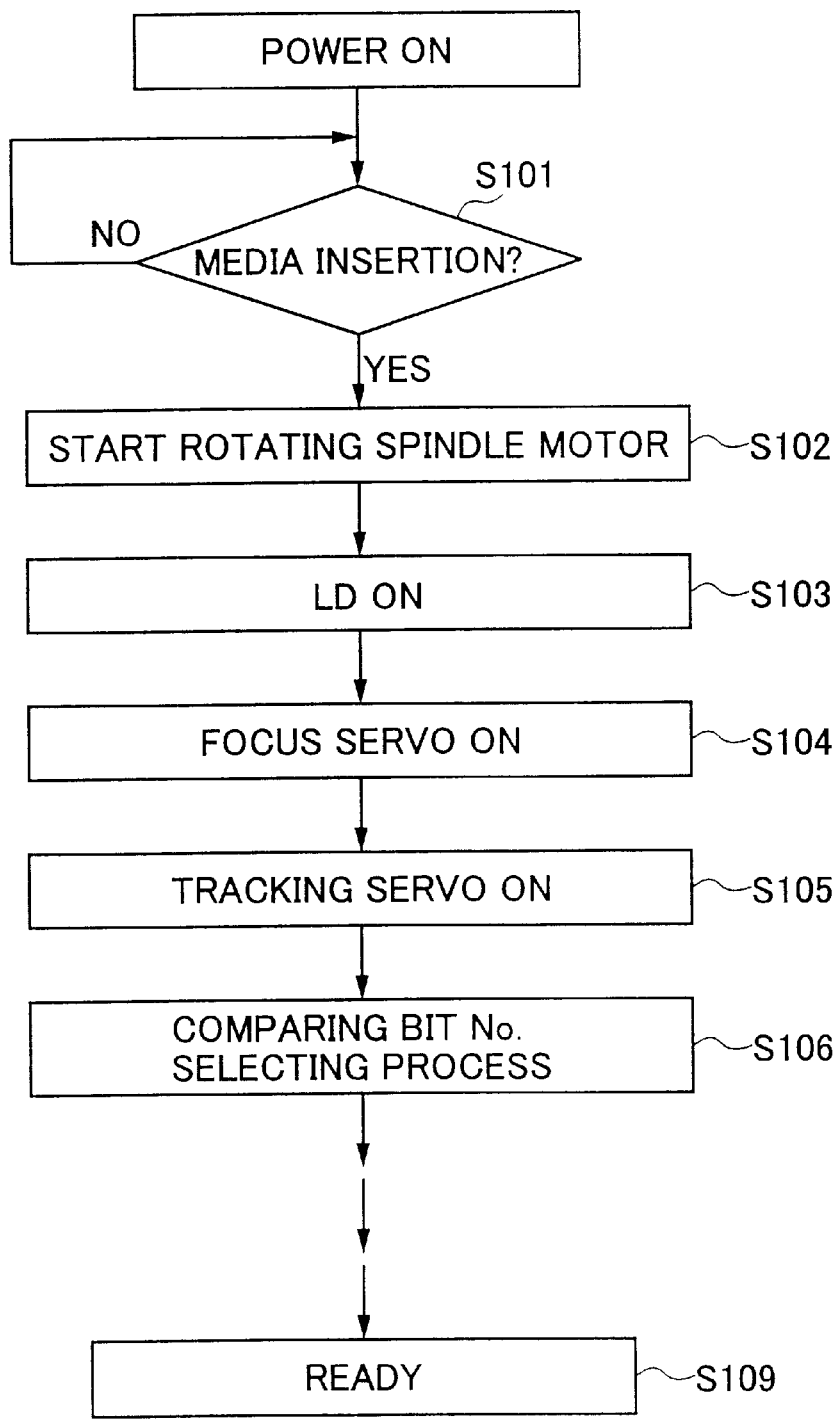
FIG. 20 is a flow chart for explaining a process of an eleventh embodiment of the data read method according to the present invention.

FIG. 20 is a flow chart for explaining a process of this eleventh embodiment of the data read method. More particularly, FIG. 20 shows a timing for carrying out the comparing bit number selecting process. When the power of the optical disk unit is turned ON in FIG. 20, a step S101 decides whether or not the media, that is, the optical disk 11, is inserted into the optical disk unit. Steps S102 through S105 are carried out if the decision result in the step S101 becomes YES. The step S102 starts rotating the spindle motor 10, and the step S103 turns ON the laser diode (LD) within the LD unit 12. The step S104 turns ON the focus servo, and the step S105 turns ON the tracking servo. A step S106 carries out a comparing bit number selecting process described above in conjunction with FIG. 19. After the step S106, a process that is carried out is similar to that carried out when the power of the optical disk unit is turned ON, and finally, a step S109 controls the optical disk unit to a ready state capable of carrying out a write/read (W/R) process.

Next, a description will be given of a twelfth embodiment of the data read method according to the present invention. In this twelfth embodiment of the data read method, the comparing bit number selecting process described above is carried out after a prescribed time elapses from a time when the operation of the optical disk unit is started. As a result, this embodiment can select an optimum number of comparing bits suited for an environment in which the optical disk unit is used.

Figure 21:
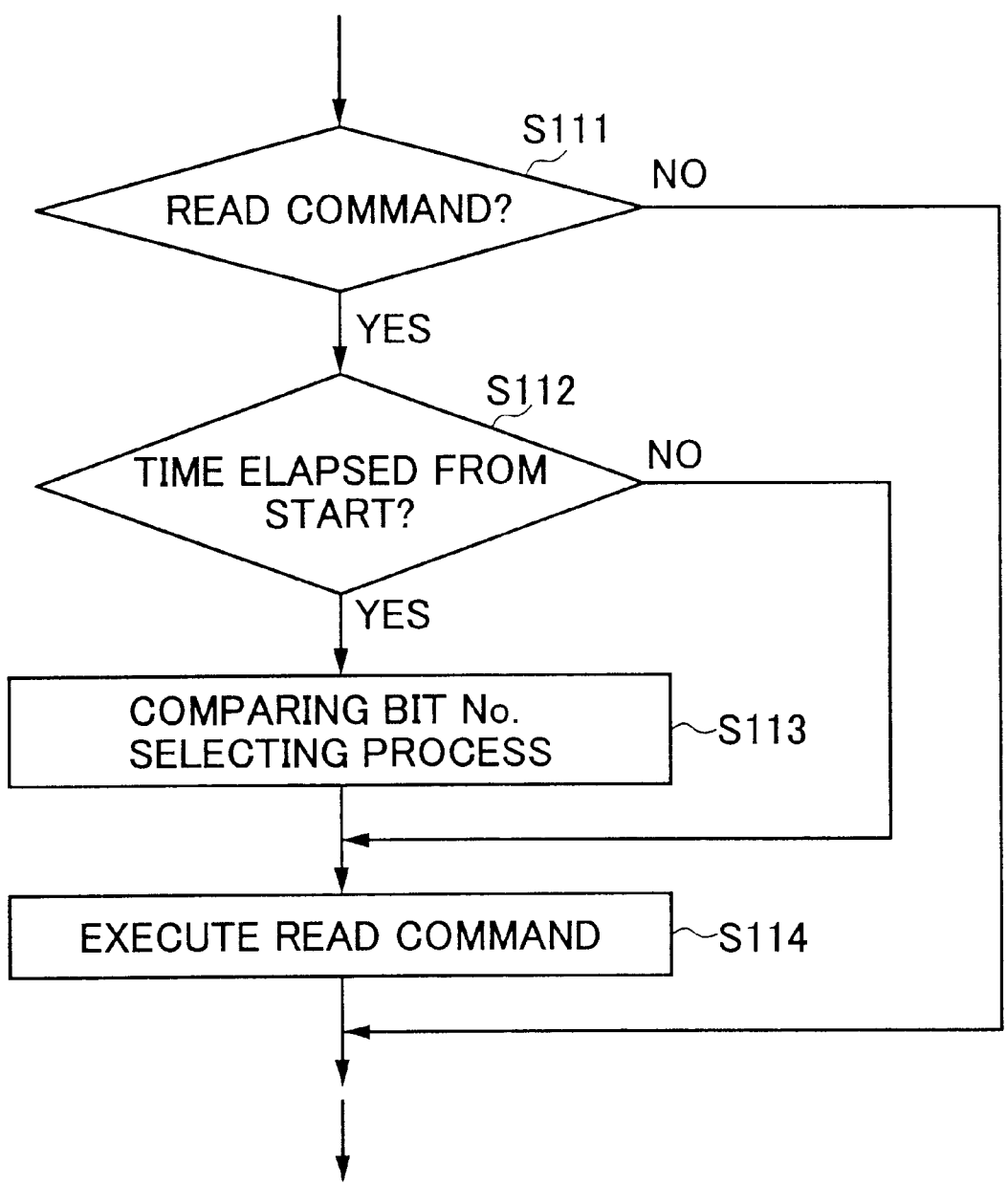
FIG. 21 is a flow chart for explaining a process of a twelfth embodiment of the data read method according to the present invention.

FIG. 21 is a flow chart for explaining a process of this twelfth embodiment of the data read method. More particularly, FIG. 21 shows a timing with which the comparing bit number selecting process is carried out. In FIG. 21, a step Slll decides whether or not a read command is received. If the decision result in the step S111 is YES, a step S112 decides whether or not a prescribed time has elapsed from a time when the operation of the optical disk unit is started. If the decision result in the step S112 is YES, a step S113 carries out a comparing bit number selecting process described above in conjunction with FIG. 19. If the decision result in the step S112 is NO or, after the step S113, a step S114 executes the read command.

Next, a description will be given of a thirteenth embodiment of the data read method according to the present invention. In this thirteenth embodiment of the data read method, the comparing bit number selecting process described above is carried out when no access is made to the optical disk unit for a prescribed time. As a result, this embodiment can select an optimum number of bits suited for an environment in which the optical disk unit is used.

Figure 22:
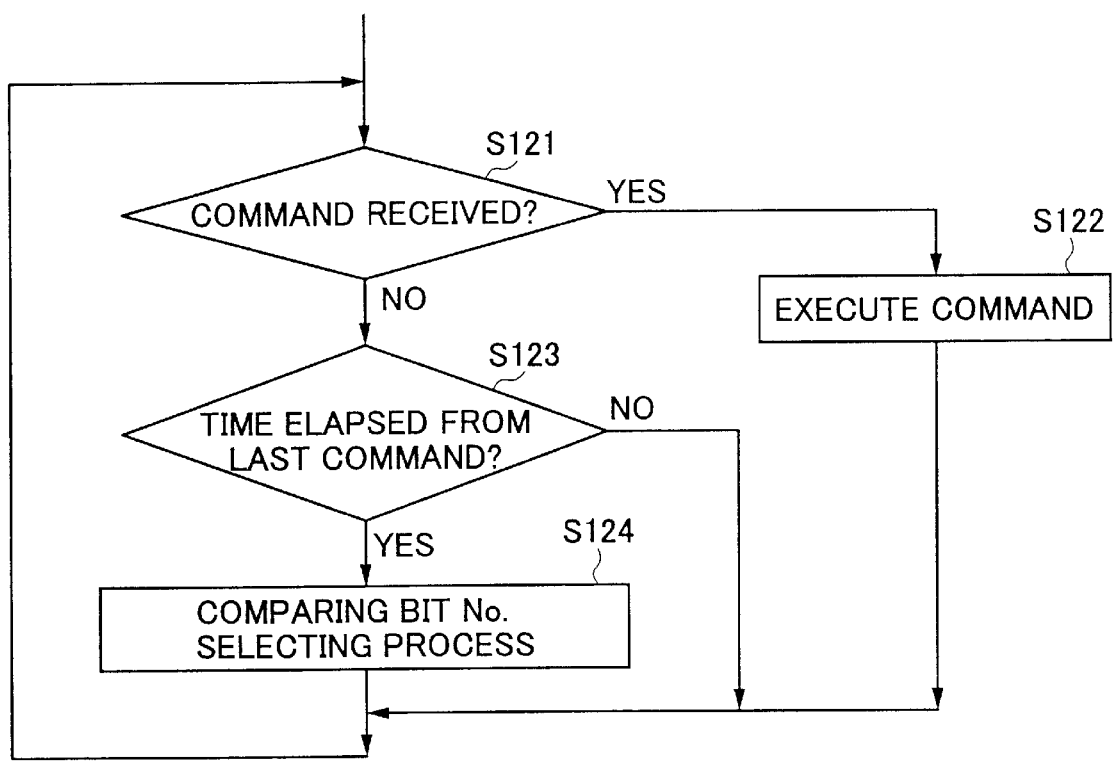
FIG. 22 is a flow chart for explaining a process of a thirteenth embodiment of the data read method according to the present invention.

FIG. 22 is a flow chart for explaining a process of this thirteenth embodiment of the data read method. More particularly, FIG. 22 shows a timing with which the comparing bit number selecting process is carried out. In FIG. 22, a step S121 decides whether or not a command is received. If the decision result in the step S121 is YES, a step S122 executes the received command. On the other hand, if the decision result in the step S121 is NO, a step S123 decides whether or not a prescribed time has elapsed from a time when a command was last received, that is, from a time when the last command was received. If the decision result in the step S123 is YES, a step S124 carries out a comparing bit number selecting process described above in conjunction with FIG. 19.

Next, a description will be given of a fourteenth embodiment of the data read method according to the present invention. In this fourteenth embodiment of the data read method, the comparing bit number selecting process described above is carried out when a prescribed number of read retry processes is generated. As a result, this embodiment can select an optimum number of bits suited for an environment in which the optical disk unit is used.

Figure 23:
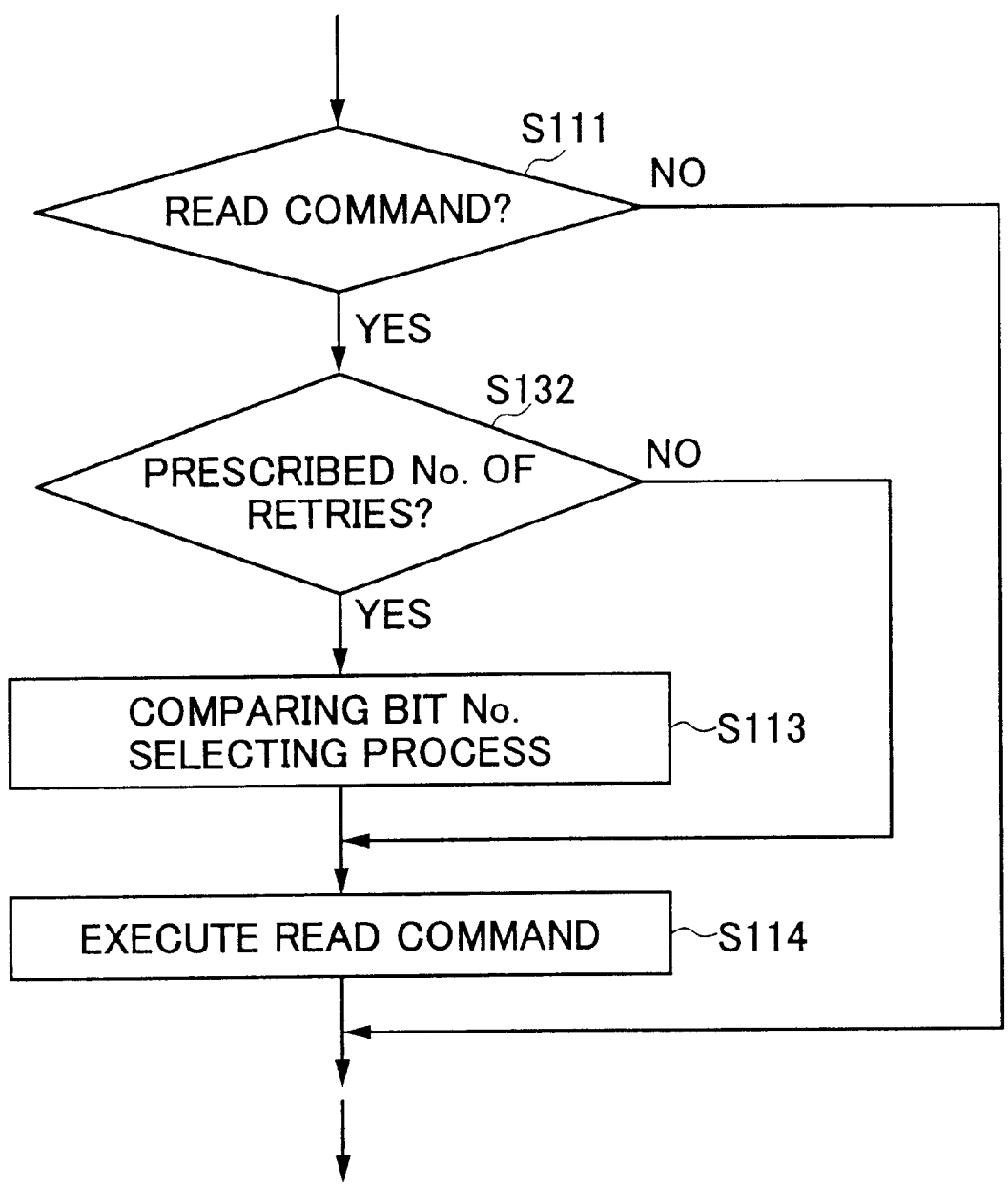
FIG. 23 is a flow chart for explaining a process of a fourteenth embodiment of the data read method according to the present invention.

FIG. 23 is a flow chart for explaining a process of this fourteenth embodiment of the data read method. More particularly, FIG. 23 shows a timing with which the comparing bit number selecting process is carried out. In FIG. 23, those steps which are the same as those corresponding steps in FIG. 21 are designated by the same reference numerals, and a description thereof will be omitted. In FIG. 23, if the decision result in the step S111 is YES, a step S132 decides whether or not a number of times a read retry process is generated from a time when the operation of the optical disk unit is started is greater than or equal to a prescribed number. The process advances to the step S113 if the decision result in the step S132 is YES, and the process advances to the step S114 if the decision result in the step S132 is NO.

Next, a description will be given of a fifteenth embodiment of the data read method according to the present invention. In this fifteenth embodiment of the data read method, the comparing bit number selecting process described above is carried out during a manufacturing process of the optical disk unit.

Figure 24:
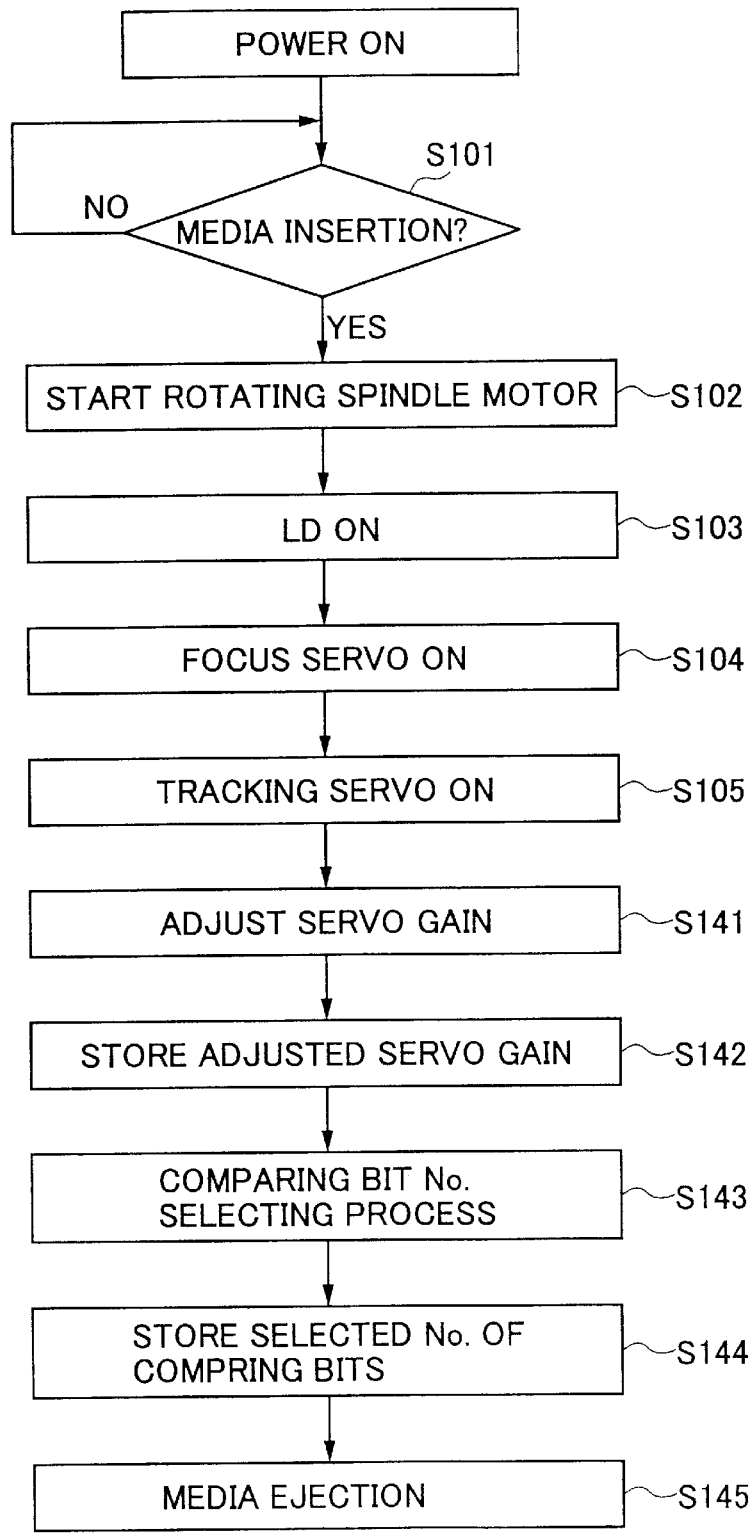
FIG. 24 is a flow chart for explaining a process of a fifteenth embodiment of the data read method according to the present invention.

FIG. 24 is a flow chart for explaining a process of this fifteenth embodiment of the data read method. More particularly, FIG. 24 shows a timing with which the comparing bit number selecting process is carried out. In FIG. 24, those steps which are the same as those corresponding steps in FIG. 20 are designated by the same reference numerals, and a description thereof will be omitted. In FIG. 24, steps S141 through S145 are carried out after the step S105. The step S141 adjusts a servo gain, and the step S142 stores the adjusted servo gain in the nonvolatile memory 3. The step S143 carries out a comparing bit number selecting process described above in conjunction with FIG. 19. The step S144 stores the number of comparing bits selected by the comparing bit number selecting process into the nonvolatile memory 3, and the step S145 ejects the optical disk 11 from the optical disk unit.

Next, a description will be given of a sixteenth embodiment of the data read method according to the present invention. In this sixteenth embodiment of the data read method, a majority read process is carried out using the number of comparing bits selected and stored by the process described above in conjunction with FIG. 24.

FIG. 25 is a flow chart for explaining this sixteenth embodiment of the data read method. More particularly, FIG. 25 shows the process which uses the stored number of comparing bits. In FIG. 25, those steps which are the same as those corresponding steps in FIG. 21 are designated by the same reference numerals, and a description thereof will be omitted. In FIG. 25, if the decision result in the step S111 is YES, a step S151 decides whether or not a majority read process is to be carried out. If the decision result in the step S151 is YES, a step S152 decides whether or not the number of comparing bits is stored in the nonvolatile memory 3. If the decision result in the step S152 is YES, a step S153 carries out the majority read process using the stored number of comparing bits. If the decision result in the step S152 is NO, a step S154 carries out a majority read process without specifying the number of comparing bits. In addition, if the decision result in the step S151 is NO, a step S155 carries out a normal read process which does not use the majority read process.

When the comparing bit number selecting process is carried out during the normal operation of the optical disk unit, the processing speed of the optical disk unit may appear slow when seen from the host unit. However, by carrying out the majority read process using the stored number of comparing bits as in this embodiment, it is possible to positively prevent deterioration of the processing speed.

The timing at which the comparing bit number selecting process is carried out may be set arbitrarily. For example, the comparing bit number selecting process may be carried out at a timing which is based on the output detection signal of the temperature sensor 16. In this case, it is possible to carry out the comparing bit number selecting process when a temperature change becomes greater than or equal to a prescribed value, that is, a difference between the temperature detected during the previous majority read process and the temperature detected during the present majority read process becomes greater than or equal to the prescribed value.

In the embodiments described above, the present invention is applied to the optical disk unit. However, the application of the present invention if of course not limited to the optical disk unit. The present invention is similarly applicable to magnetic disk units which use magnetic disks such as hard disks and floppy disks, and storage apparatuses which use various kinds of recording media such as tape-shaped and card-shaped magnetic recording media and optical recording media.

Further, the present invention is not limited to these embodiments, but various variations and modifications may be made without departing from the scope of the present invention.

What is claimed is:

1. A data read method comprising the steps of:
    (a) reading identical data from one region on a recording medium a plurality of times;
    (b) comparing the data read the plurality of times in units of one or a plurality of bits to obtain comparison results, and generating read data made up of data values having a highest frequency for each unit based on the comparison results; and
    (c) carrying out an error detecting and correcting process with respect to the read data.

2. The data read method as claimed in claim 1, wherein said step (b) varies a number of bits forming the unit.

3. The data read method as claimed in claim 2, wherein said step (b) sets the unit to a number of bits which makes the comparison results identical with a highest frequency.

4. The data read method as claimed in claim 3, wherein said step (b) sets the unit to said number of bits at an arbitrary timing.

5. The data read method as claimed in claim 3, further comprising the step of:
    (d) carrying out a read retry process,
    said step (b) setting the unit to said number of bits when the read retry process is carried out a predetermined number of times.

6. The data read method as claimed in claim 1, wherein said step (b) generates the read data made up of the data values having the highest frequency for each unit when the comparison results are identical at least a predetermined number of times.

7. The data read method as claimed in claim 1, wherein said step (b) increases the number of bits forming the unit when the comparison results are identical at least a predetermined number of times.

8. The data read method as claimed in claim 1, wherein said step (b) decreases the number of bits forming the unit when the comparison results are different at least a predetermined number of times.

9. The data read method as claimed in claim 1, further comprising the step of:
    (d) carrying out a read retry process,
    said step (b) being carried out when the read retry process fails a predetermined number of times.

10. A storage apparatus comprising:
    reading means for reading identical data from one region on a recording medium a plurality of times;
    generating means for comparing the data read the plurality of times in units of one or a plurality of bits to obtain comparison results, and generating read data made up of data values having a highest frequency for each unit based on the comparison results; and
    correcting means for carrying out an error detecting and correcting process with respect to the read data.

11. A storage apparatus comprising:
    a reading section reading identical data from one region on a recording medium a plurality of times;
    a generating section comparing the data read the plurality of times in units of one or a plurality of bits to obtain comparison results, and generating read data made up of data values having a highest frequency for each unit based on the comparison results; and
    an error correcting section carrying out an error detecting and correcting process with respect to the read data.

12. The storage apparatus as claimed in claim 11, wherein said generating section varies a number of bits forming the unit.

13. The storage apparatus as claimed in claim 12, wherein said generating section sets the unit to a number of bits which makes the comparison results identical with a highest frequency.

14. The storage apparatus as claimed in claim 13, wherein said generating section sets the unit to said number of bits at an arbitrary timing.

15. The storage apparatus as claimed in claim 13, further comprising:
    a retry section carrying out a read retry process,
    said generating section setting the unit to said number of bits when the read retry process is carried out a predetermined number of times.

16. The storage apparatus as claimed in claim 11, wherein said generating section generates the read data made up of the data values having the highest frequency for each unit when the comparison results are identical at least a predetermined number of times.

17. The storage apparatus as claimed in claim 11, wherein said generating section increases the number of bits forming the unit when the comparison results are identical at least a predetermined number of times.

18. The storage apparatus as claimed in claim 11, wherein said generating section decreases the number of bits forming the unit when the comparison results are different at least a predetermined number of times.

19. The storage apparatus as claimed in claim 11, further comprising:
    a retry section carrying out a read retry process,
    said generating section being carried out when the read retry process fails a predetermined number of times.

* * * * *